US012649075B2

(12) United States Patent
Feenstra et al.

(10) Patent No.: US 12,649,075 B2
(45) Date of Patent: Jun. 9, 2026

(54) FIRE PROTECTION FLOOR NOZZLES, SYSTEMS AND METHODS FOR FLOOR NOZZLE SPRAY SYSTEMS

(71) Applicant: Minimax Viking Patent Management GmbH, Bad Oldesloe (DE)

(72) Inventors: Shawn J. Feenstra, Caledonia, MI (US); Vinh Bao Hoa, Grand Rapids, MI (US)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 547 days.

(21) Appl. No.: 17/945,784

(22) Filed: Sep. 15, 2022

(65) Prior Publication Data

US 2023/0079327 A1 Mar. 16, 2023

Related U.S. Application Data

(63) Continuation of application No. PCT/US2022/043505, filed on Sep. 14, 2022.

(60) Provisional application No. 63/244,765, filed on Sep. 16, 2021, provisional application No. 63/244,758, filed on Sep. 16, 2021, provisional application No. 63/244,761, filed on Sep. 16, 2021.

(51) Int. Cl.

| | |
|---|---|
| ***A62C 31/12*** | (2006.01) |
| ***A62C 31/05*** | (2006.01) |
| ***A62C 35/68*** | (2006.01) |

(52) U.S. Cl.

CPC .............. *A62C 31/12* (2013.01); *A62C 31/05* (2013.01); *A62C 35/68* (2013.01)

(58) Field of Classification Search

CPC .. A62C 5/02; A62C 3/08; A62C 31/12; A62C 31/05; A62C 35/68; B05B 3/1021; B05B 1/267

See application file for complete search history.

(56) References Cited

U.S. PATENT DOCUMENTS

| | | | |
|---|---|---|---|
| 3,583,637 A | 6/1971 | Miscovich | |
| 3,836,076 A | 9/1974 | Conrad et al. | |
| 4,091,873 A | 5/1978 | Werner | |
| 4,653,693 A * | 3/1987 | Steingass | B05B 1/083 239/456 |
| 5,058,809 A | 10/1991 | Carroll et al. | |
| 5,113,945 A | 5/1992 | Cable | |
| 5,382,389 A | 1/1995 | Goodine et al. | |
| 5,538,027 A | 7/1996 | Adamson et al. | |
| 5,848,752 A | 12/1998 | Kolacz et al. | |
| 6,182,767 B1 * | 2/2001 | Jackson | A62C 31/02 244/114 R |

(Continued)

FOREIGN PATENT DOCUMENTS

| | | |
|---|---|---|
| WO | WO 2017/012601 | 1/2017 |
| WO | WO 2020/112629 | 6/2020 |

(Continued)

*Primary Examiner* — Tuongminh N Pham

(74) *Attorney, Agent, or Firm* — Perkins Coie LLP

(57) ABSTRACT

A floor nozzle assembly and systems and methods including means for generating and distributing a firefighting foam. The means generates and distributes a fluorine-free foam having an effective foam quality for total coverage over a floor area of at least 25 ft.×25 ft. at an application density of at least 0.1 GPM/SQ. FT with the floor area having a slope of 1 in: 8 ft.

36 Claims, 18 Drawing Sheets

(56) References Cited

U.S. PATENT DOCUMENTS

| | | | |
|---|---|---|---|
| 6,383,608 | B1 | 5/2002 | Burkett et al. |
| 6,481,644 | B1 | 11/2002 | Olsen |
| 9,155,926 | B2 | 10/2015 | Mason |
| D813,349 | S | 3/2018 | Rudrapada et al. |
| 2004/0188104 | A1 | 9/2004 | Borisov et al. |
| 2008/0265063 | A1* | 10/2008 | Schmidt .................. B05B 1/262 239/518 |
| 2011/0083863 | A1 | 4/2011 | Mason |
| 2011/0259617 | A1 | 10/2011 | Lelic et al. |
| 2011/0290509 | A1 | 12/2011 | Uppal |
| 2012/0186831 | A1 | 7/2012 | Simpson et al. |
| 2013/0000928 | A1 | 1/2013 | Mason et al. |
| 2019/0262647 | A1* | 8/2019 | Havelka-Rivard .. A62D 1/0071 |
| 2020/0023215 | A1 | 1/2020 | Feenstra et al. |
| 2022/0023691 | A1 | 1/2022 | Feenstra et al. |

FOREIGN PATENT DOCUMENTS

| | | |
|---|---|---|
| WO | WO 2020/112632 | 6/2020 |
| WO | WO 2021/171219 | 9/2021 |
| WO | WO 2023/043822 | 9/2023 |

* cited by examiner

FIRE PROTECTION FLOOR NOZZLES, SYSTEMS AND METHODS FOR FLOOR NOZZLE SPRAY SYSTEMS

PRIORITY DATA & INCORPORATION BY REFERENCE

The application is a continuation of International Patent Application No. PCT/US2022/043505, filed Sep. 14, 2022, and claims the benefit of priority to U.S. Provisional Patent Application No. 63/244,758, filed on Sep. 16, 2021; U.S. Provisional Patent Application No. 63/244,761, filed on Sep. 16, 2021; and U.S. Provisional Patent Application No. 63/244,765, filed on Sep. 16, 2021, each of which is incorporated by reference in its entirety.

TECHNICAL FIELD

The present disclosure generally relates to a spray system and, more particularly, to a floor nozzle and floor nozzle system which are mounted in floor trenches of a target area, such as an airplane hangar floor, a flight deck, or the like, for delivering a fluorine-free foam fire suppressant to the floor area.

BACKGROUND

Conventional floor fire protection systems for aircraft runways, aircraft hangars, helicopter landing pads ("helipads"), or the like include a network of pipes which are often positioned beneath the surface. These systems typically include articulating discharge nozzles which move from a recessed position below the ground level to an elevated position when the system is actuated, such as disclosed in U.S. Pat. No. 3,583,637 to Miscovich. Aircraft hangars are typically protected from flammable liquid fires using aqueous film forming foam (AFFF) fire suppressant, which is dispersed from oscillating monitors that spray foam to the area under the wing areas of the aircraft. As these oscillating monitors require mechanical operation, they must be maintained so that the setting of the monitor remains correct. As a result of positioning to avoid travel paths of aircraft and other equipment, the spray from the monitor or nozzles may not be as effective and the angle which the fire suppressant is delivered exposes the aircraft to potential contact with the fire suppressant, which may cause damage to the aircraft or equipment. In addition, because of the spray pattern, aircraft or equipment in the vicinity may form an obstruction which can block the flow of the fire suppressant to the fire area.

Other systems incorporate fixed nozzles, such as disclosed in U.S. Pat. No. 6,371,212 to Jackson, International Pub. No. WO 2020/112629 to Feenstra, and International Pub. No. WO 2021/171219 to Maas, Jr. References Jackson, Feenstra, and Maas, Jr. disclose fixed position nozzles that are recessed below the floor area; however, Jackson, Feenstra, and Maas, Jr. include nozzles that project the fire suppressant in a generally lateral radial pattern. The nozzle of Jackson includes a plurality of projecting members forming passageways having geometry that is suitable for use with AFFF fire suppressant, which combines fluoro- and hydrocarbon-surfactants to provide fire and vapor suppression of hydrocarbon fuel fires and other fires. Jackson shows and describes the radial inner portion and radial outer portion of each of the projecting members having constant radius, semi-circular configurations, with the inner radius being smaller than the outer radius such that the side walls extend along respective radial lines; however, the constant radius of the outer end of the projecting members starts the divergence of the outlet radially earlier within the passageway and it is believed that this configuration limits the momentum of the fire suppressant exiting the deflector. For example, known commercialization of nozzles similar to the nozzle shown and described by Jackson have a ratio of the length of the convergent portion to the length of the divergent portion from about 1:0.75 to 1:0.80. The limited momentum of the fire suppressant at the outlet of the passageway reduces the throw distance of each stream of fire suppressant, which reduces the coverage area (e.g., a protected area) in which the deflector of Jackson can deliver fire suppressant. The reduced throw is particularly limiting when new generations of fluorine-free foam concentrates (examples described below) are used with nozzles similar to the nozzle of Jackson.

Jackson further shows and describes a lower surface of the deflector flange having a curved frustoconical surface and a transition to linear frustoconical surface toward the outer circumference of the deflector. Jackson shows and describes arranging the plurality of projecting members at least at the outer half of the linear frustum surface, and it is believed that the length of the plurality of projecting members being less than 50% of the radial length of the linear frustoconical surface limits the momentum of the fire suppressant exiting the deflector. It is believed that nozzles similar to those shown and described in Jackson are incapable of providing adequate coverage of a protected area when used with the new generations of fluorine free fire suppression foam, and in particular are incapable of this performance when the protected area has any incline (e.g., if the protected area has a crowned peak at any location within the protected area). By having inclined surfaces sloping upward from the nozzle, protected areas with crowned peaks hinder the fire suppressant delivery of conventional systems to the entire protected area.

The nozzle of Feenstra includes a plurality of projecting members having a generally elliptical shape, and like Jackson, has a configuration that limits momentum of the fire suppressant exiting the nozzle and reduces the throw distance of each stream of fire suppressant, which reduces the coverage area (e.g., a protected area) in which the deflector of Feenstra can deliver fire suppressant. It is believed that nozzles similar to those shown and described in Feenstra are incapable of providing adequate coverage of a protected area when used with the new generations of fluorine free fire suppression foam, and in particular are incapable of this performance when the protected area has any incline (e.g., if the protected area has a crowned peak at any location within the protected area). By having inclined surfaces sloping upward from the nozzle, protected areas with crowned peaks hinder the fire suppressant delivery of conventional systems to the entire protected area.

The nozzle of Maas, Jr. includes a plurality of projecting members having a generally narrowing shape along the length of each of the projecting members, causing each passageway between the projecting members to be diverging along the entire length of the passageway after the converging inlet portion. The diverging outlet portion of Maas, Jr. has linear sidewalls positioned in a diverging configuration and does not include any curved area having radii, and like Jackson and Feenstra, has a configuration that limits momentum of the fire suppressant exiting the nozzle and reduces the throw distance of each stream of fire suppressant, which reduces the coverage area (e.g., a protected area) in which the deflector of Maas, Jr. can deliver fire suppressant. It is believed that nozzles similar to those shown and described in Maas, Jr. are incapable of providing adequate coverage of a protected area when used with the new generations of fluorine free fire suppression foam, and in particular are incapable of this performance when the protected area has any incline (e.g., if the protected area has a crowned peak at any location within the protected area). By having inclined surfaces sloping upward from the nozzle, protected areas with crowned peaks hinder the fire suppressant delivery of conventional systems to the entire protected area.

New generations of fire suppressing foam include fluorine-free foams (FF Foam) generated from fluorine free foam concentrates (hereinafter "FF foam concentrate"), such as Enviro USP FF 3% foam concentrate by FOMTEC®, available from Dafo Fomtec AB, P.O. Box 683, SE-135 26 Tyresö, Sweden; or Avio$^{F3}$ Green KHC FF 3% Fluorine Free (FF) Foam Concentrate NFC535 or Avio$^{F3}$ Green KHC FF 6% Fluorine Free (FF) Foam Concentrate NFC535 each by NATIONAL FOAM®, available from National Foam, 141 Junny Rd., Angier, NC 27501. The nozzles of Jackson and other similar nozzles configured for AFFF generation and distribution have reduced performance when supplied with an FF foam concentrate, and as a result, the FF foam fire suppressant throw distance is restricted, which can cause insufficient coverage of a protected area without additional nozzles. Additional nozzles could be added to a system to overcome a reduced performance of a nozzle distributing an FF foam. However, adding nozzles to existing installations for adequate coverage using FF foam concentrate supplies requires significant construction renovation (demolition of new trenches, additional plumbing, larger supply equipment, layout restrictions, new hardware, etc.). Consequently, there is a need for a fire suppression system which can deliver FF foam to a protected area of a hangar, flight deck, or the like, which minimizes the contact between the fire suppressant and the aircraft supported on the floor area, and yet delivers the FF foam with throw distance and coverage spread that can quickly and totally cover a protected area in the event of a fire without needing additional nozzle locations compared to current technology systems.

Firefighting foam extinguishants and suppressants, such as AFFFs and FF foams, and the nozzles or systems using such foam extinguishants can be "listed" or approved under one or more industry accepted standards for use in addressing certain types of fires. One known approval standard entitled, "Examination Standard for Foam Extinguishing Systems: Class Number 5130" (May 2021) from FM Approvals LLC, hereinafter "FM 5130" which is incorporated by reference in its entirety, describes the standards for fixed fire extinguishing systems that use an aqueous foam as the extinguishment. FM 5130 describes the foam requirements for floor nozzle systems, which FM 5130 defines as a "system that provides low-expansion foam discharge nozzles installed flush with the structural floor, supplied with foam-water solution through piping installed in trenches in the floor." Section 4.4 of FM 5130 specifically provides the approval requirements for discharge devices such as floor nozzles. In order to qualify under the standard, the floor nozzle shall produce foam of "approximately equivalent quality to that undergoing a successful fire test, when tested using a solution of the same concentrate at the same concentration ratio." Section 4.3 of FM 5130 outlines the manner for determining the "foam quality" of a foam "produced from a concentrate at a specified concentration ratio that has been successfully fire tested" in accordance with FM 5130, Section 4.2. Under Section 4.3, the foam quality of a successfully tested fire tested foam is determined by measuring the "expansion ratio" and the "25 percent drainage time" for the foam. These foam quality parameters can then be used, "to establish benchmark values for use in evaluation of the effectiveness of any discharge devices proposed for use with that foam." Expansion ratio, as defined by FM 5130, is a ratio of volume of expanded foam to that of the same weight of the foam solution. Generally, the expansion ratio is a ratio of the weight of a volume of discharged foam to the weight of a volume of the foam solution used to generate the discharged foam. The "25 percent drainage time" is the time, calculated in accordance with FM 5130, to collect "the liquid solution equivalent to 0.25 of a graduate cylinder's foam weight. Thus, as used herein, an "effective foam quality" is a resulting foam quality of a discharged foam having an expansion ratio and 25 percent drainage time that falls within the benchmark values, as determined under Section 4.3 of FM 5130, for the foam generated from a concentrate successfully fire tested under Section 4.2 of FM 5130; equivalent or later developed tests or foam measurements that utilize the parameters of FM 5130 can also be used to define an effective foam quality. Therefore, in addition to needing fire suppression systems which can deliver FF foam concentrate with a desired throw distance and coverage, there remains a need for systems and devices that can generate and distribute an FF foam at the desired throw distance and coverage with an effective foam quality.

SUMMARY

The present disclosure is directed to a floor fire suppressant system that is particularly suitable for extinguishing hydrocarbon fuel based fires with fluorine-free (FF) foam on a protected area, such as a floor area of a hangar, platform, runway or other aircraft areas. The fire suppressant system delivers fire suppressant to the floor area in a manner to minimize contact with the aircraft stored or positioned in the floor area. The fire suppressant system includes a preferred floor nozzle and floor grating assembly which is capable of resisting heavy loads such as the weight of an aircraft or equipment and maintains operation, on at least a limited basis, even with the aircraft parked over the nozzle. In this manner, the fire suppressant system of the present invention can operate without obstruction from vehicles in the immediate or nearby vicinity of a nozzle in floor grating assembly.

Preferred embodiments of a floor nozzle include a floor nozzle for a floor fire suppressant system, the floor nozzle comprising a body; a deflector engaged with the body; and preferred means for generating and distributing a fluorine-free foam over a floor area of at least 25 ft.×25 ft. at an application density of at least 0.1 GPM/SQ. FT. in which the floor area has a slope with respect to the deflector of 1 in: 8 ft. The preferred means generating and distributing the fluorine-free foam with an effective foam quality. More preferably, the means generates and distributes the foam a radial distance of 25 ft. along the slope having an effective foam quality. In preferred embodiments of the floor nozzle, the means distributes the fluorine-free foam so as to reach a radial distance of 25 ft. along the slope within less than one minute (1 min.) and more preferably reach the radial distance of 25 ft. along the slope in less than thirty seconds (30 sec.). Moreover, the preferred means distributes the fluorine-free foam with an application density of at least 0.2 GPM/SQ. FT. in a one square foot area located at a radial distance up the slope of 25 ft. from the deflector. The preferred means generate the fluorine free foam from a solution using at least a 3% fluorine free concentrate.

In preferred embodiments of the floor nozzle, the means includes a plurality of passageways between the body and the deflector that are circumferentially spaced about a central nozzle axis. Each passageway has a converging inlet portion and a diverging outlet portion, through which the foam exits to form a generally lateral radial pattern for delivering to the protected area. Each passageway has first and second side walls positioned between the converging inlet portion and the diverging outlet portion. The first and second side walls are preferably parallel to one another. Moreover, each passageway is preferably defined by an upper surface and a lower surface separated by the spaced apart first and second side walls to define height, width and cross-sectional area of the passageway. In preferred embodiments of the floor nozzle, each passageway has a first height at the diverging outlet portion and a second height at the converging inlet portion in which a ratio of the first height to the second height is from 1:1.2 to 1:1.3. Alternatively or additionally, each passageway has a width between the first and second side walls in which the width is at least ⅛ inch; and in some preferred embodiments, each passageway has a height between the divergent outlet portion and the convergent inlet portion of each passageway that is at least ⅛ inch. Moreover, in some preferred embodiments of the floor nozzle, a ratio of the length of the converging inlet to the length of the diverging outlet along the passageway is about 1:1.1 to 1:1.3.

Preferred embodiments of a floor nozzle include a body having a mounting portion configured to couple to a fire suppressant supply pipe and a body flange portion axially spaced from the mounting portion with an internal transverse passage extending therebetween along a central nozzle axis. The transverse passage defines an inlet opening and an outlet opening. The body flange portion extends around the outlet opening and includes an upper support surface. The floor nozzle also includes a deflector supported on the support surface of the body flange portion. The deflector has a deflector flange that includes an upper surface disposed normal to the central nozzle axis, a lower surface angled with respect to the upper surface and an outer perimeter between the upper surface and the lower surface that circumscribes the nozzle axis to define a linear frustoconical portion of the deflector that extends radially inward at a radial length from the outer perimeter. The support surface of the body flange portion is angled with respect to the upper surface of the deflector flange. The deflector flange includes a plurality of projecting members, each of which that has a radial inner portion and a radial outer portion. The plurality of projecting members extends from the lower surface of the deflector flange and are in supporting contact with the support surface of the body flange portion. The projecting members are circumferentially spaced around the outlet opening to form a plurality of passageways therebetween in which each passageway has a converging inlet portion and a diverging outlet portion through which fire suppressant can flow to form a generally lateral radial pattern for delivering fire suppressant to a protected area.

Preferred embodiments of the floor nozzle include one or more of the following features; and in some preferred embodiments, include all of the following features: i) the radial outer portion of each of the projecting members having a first curved edge, a second curved edge, and a third curved edge between the first and second curved edge having a different curvature than the first curved edge and the second curved edge, the first and second curved edges having a common curvature; and/or ii) each passageway has first and second side walls positioned between the converging inlet portion and the diverging outlet portion, and wherein the first and second side walls are parallel to one another; and/or iii) the plurality of projecting members extending from the outer perimeter radially inward along a majority of the radial length of the linear frustoconical portion; and/or iv) the lower surface of the deflector flange defines a first angle with respect to the upper surface of the deflector flange, the support surface of the body flange portion defines a second angle with respect to the upper surface of the deflector flange, the first angle being less than the second angle.

Preferred embodiments of the floor nozzle can be included in a mounting assembly to provide for a preferred floor fire suppressant system. Moreover, a method of delivering a fluorine free foam fire suppressant to a protected area is provided using preferred embodiments of a floor nozzle as described herein. A preferred method generally includes positioning the floor nozzle in the protected area and flowing the fluorine free foam solution fire suppressant through the plurality of passageways in a radial spray pattern onto the protected area.

These and other objects, advantages, purposes, and features of the invention will become more apparent from the study of the following description in conjunction with the drawings.

BRIEF DESCRIPTION OF THE DRAWINGS

Many aspects of the present disclosure can be better understood with reference to the following drawings. The components in the drawings are not necessarily drawn to scale. Instead, emphasis is placed on illustrating clearly the principles of the present disclosure. Furthermore, components can be shown as transparent in certain views for clarity of illustration only and not to indicate that the component is necessarily transparent. Components may also be shown schematically.

DETAILED DESCRIPTION

The terminology used in the description presented below is intended to be interpreted in its broadest reasonable manner, even though it is being used in conjunction with a detailed description of certain specific embodiments of the present disclosure. Certain terms may even be emphasized below; however, any terminology intended to be interpreted in any restricted manner will be overtly and specifically defined as such in this Detailed Description section. Additionally, the present disclosure can include other embodiments that are within the scope of the claims, but are not described in detail with respect to the Figures.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

Figure 1:
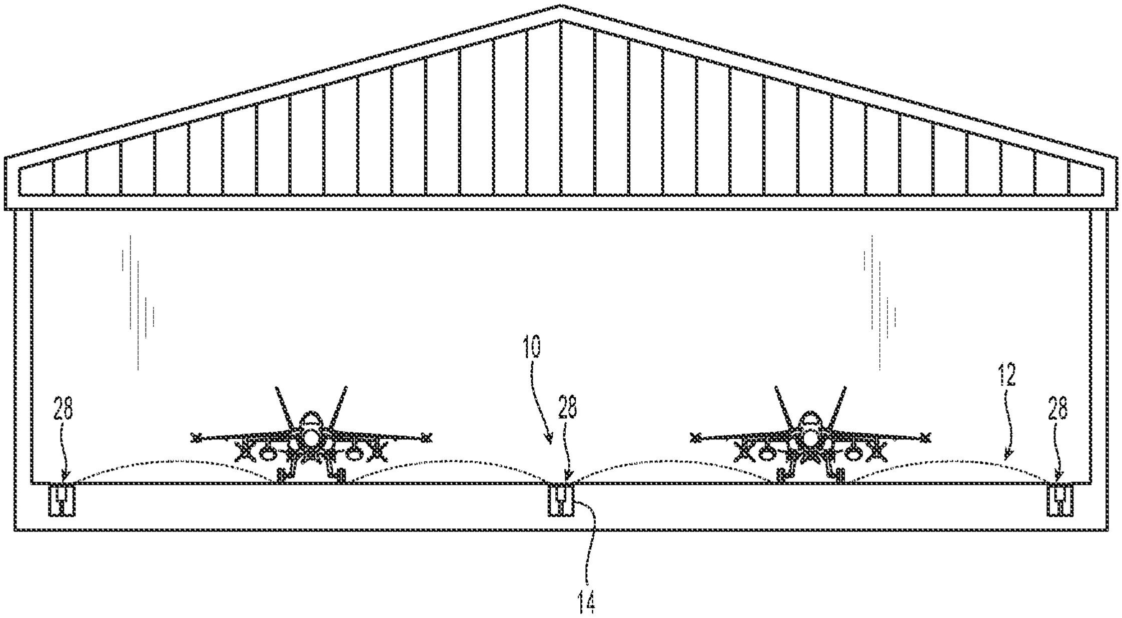
FIGS. 1 and 2 are front elevation and top plan views, respectively, showing a floor fire suppressant system configured in accordance with an embodiment of the present disclosure.
Figure 2:
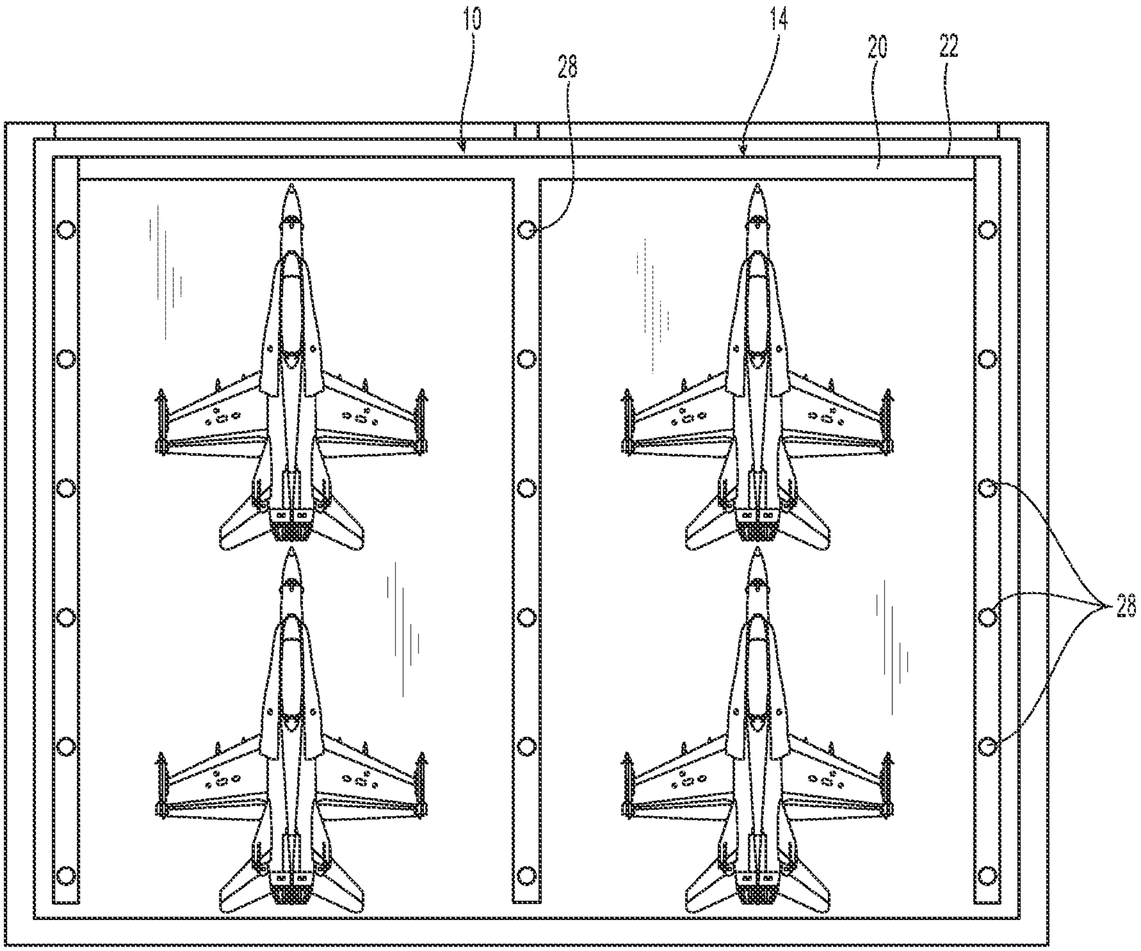

FIGS. 1 and 2 show front elevation and top plan views, respectively of a floor fire suppressant system 10 ("system 10") configured in accordance with embodiments of the present disclosure. The system 10 is suitable for extinguishing fires in a floor area 12 (e.g., a "protected area 12") of a hangar (shown as an example for illustration purposes in FIGS. 1 and 2), or in other aircraft areas including, e.g., a helicopter deck, a runway, or the like. The system 10 delivers sufficient fire suppressant to the protected area 12 to completely cover the protected area 12 while distributing the fire suppressant to the protected area 12 in a manner to minimize contact with the aircraft and/or equipment stored or positioned on the floor area 12. The protected area 12 can have an incline sloping away from a crowned peak for runoff of liquids, and in such a configuration, the system 10 can deliver sufficient fire suppressant to a protected area 12 with the incline. In these embodiments, the crown can be positioned at a higher elevation than the system 10 such that the fire suppressant must be delivered up the incline. For example, the protected area 12 can be rectangular with the system 10 positioned at a central portion of one edge of the protected area 12, and the crown positioned at any location along the opposite edge of the protected area 12 from the system 10. In this configuration of the protected area 12, all or a substantial portion of the protected area 12 is at a higher elevation than the system 10.

The system 10 of the present disclosure provides a nozzle and mounting assembly, which will be explained in greater detail below, that is capable of resisting heavy loads such as the weight from an aircraft wheel, a wheel of a fire fighting vehicle, etc., and maintain operation on at least a limited basis even with the wheel of the vehicle parked on top of the nozzle. In this manner, the fire suppressant system of the present disclosure can operate without obstruction from the vehicles in the vicinity of the floor area, including those that are positioned over the nozzle and floor grating assembly.

Figure 3:
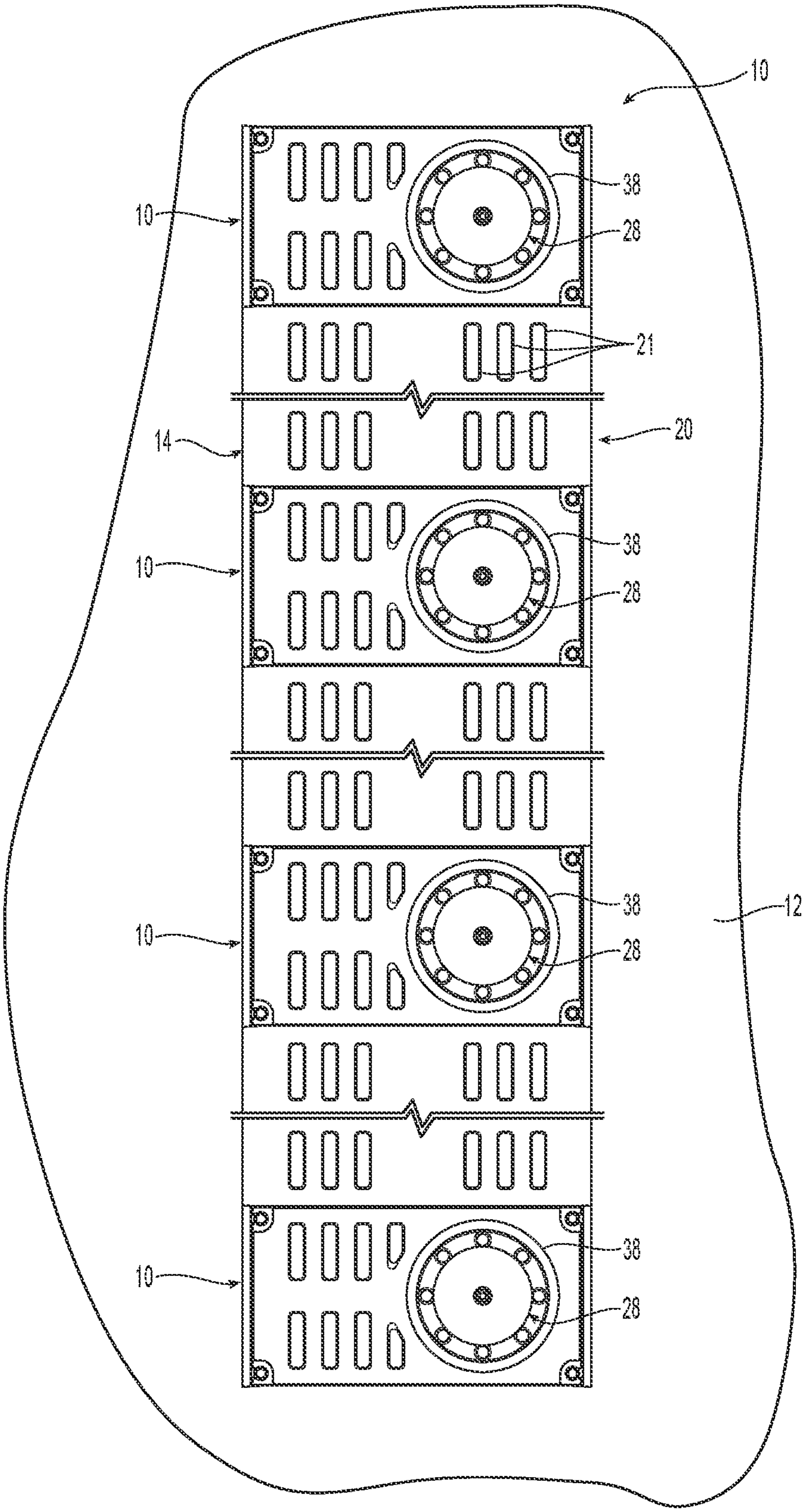
FIG. 3 is an enlarged plan view of a section of the floor fire suppressant system of FIGS. 1 and 2, showing a trench covered by floor grating.
Figure 4:
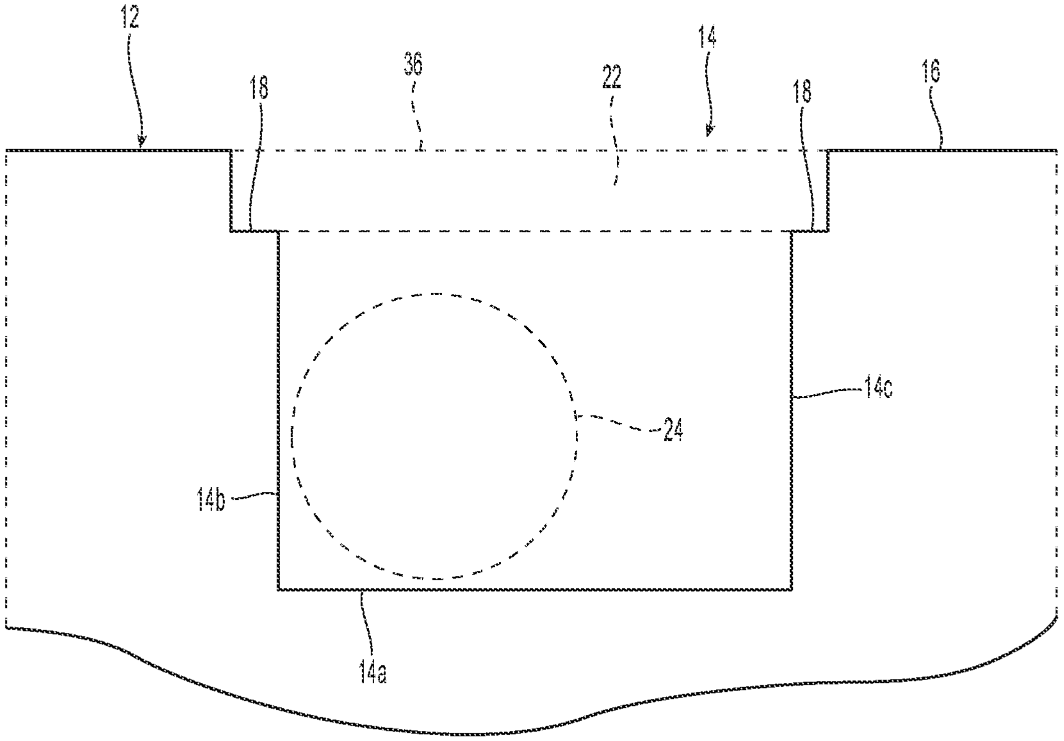
FIG. 4 is an enlarged cross section view of the trench of FIG. 3, with the fire suppressant system and floor grating removed.
Figure 5:
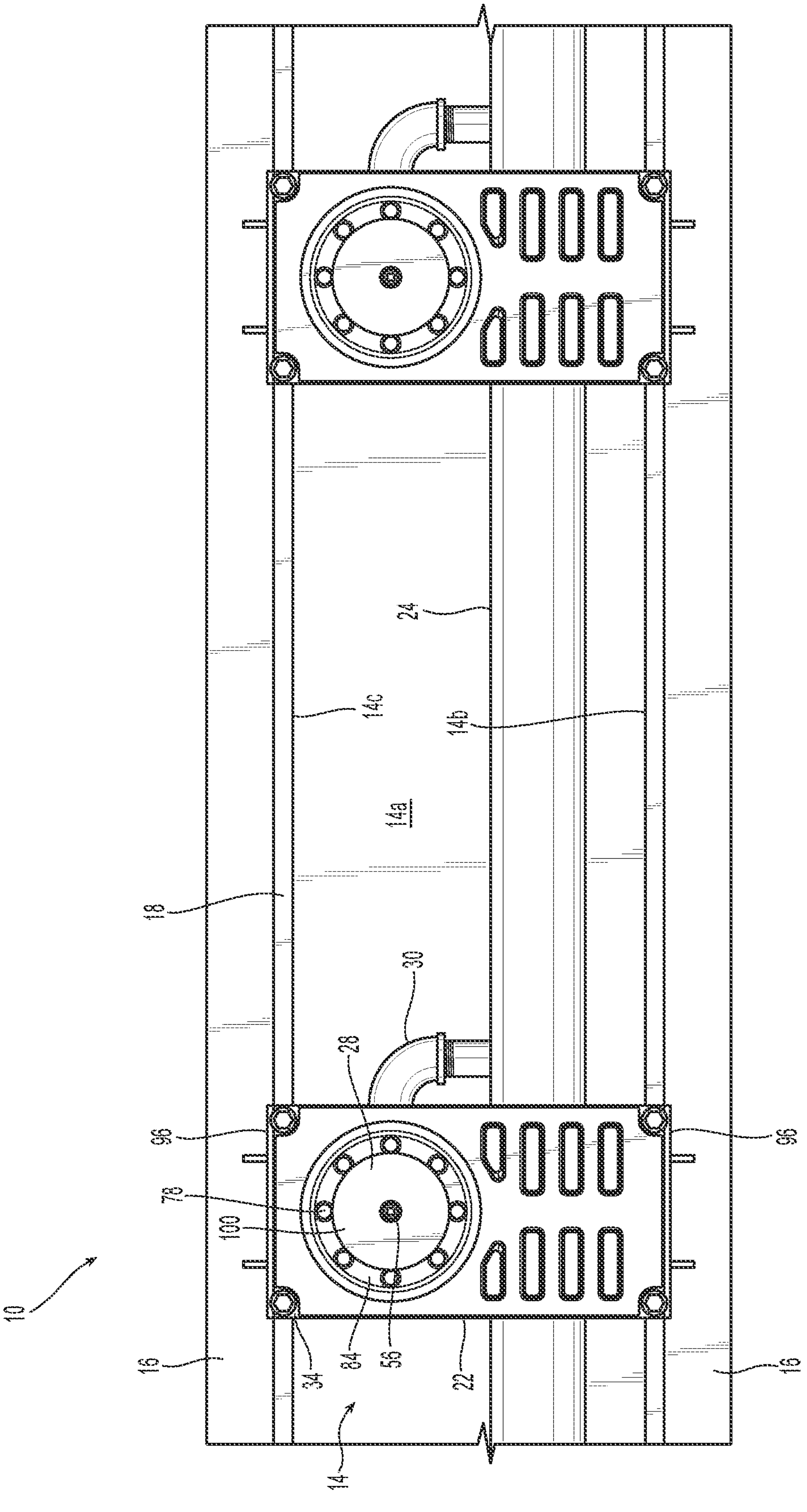
FIG. 5 is another plan view of the fire suppressant system of FIG. 3, positioned in the trench of FIGS. 3 and 4.

FIG. 3 shows a top plan view of the system 10, FIG. 4 shows a cross-sectional side view of a trench 14 positioned in the floor area 12, and FIG. 5 shows another view of the system 10 positioned in the trench 14, each view configured in accordance with embodiments of the present disclosure. Referring to FIGS. 1-5 together, the system 10 is configured for positioning in a trench 14 of the floor area 12. As shown in FIG. 4, the trench 14 extends below a floor surface 16 and includes one or more shelves or support surfaces 18 for supporting thereon a first floor grate 20 ("grating 20") and a second floor grate 22 ("grating 22"; FIG. 3). In some embodiments, the support surfaces 18 are positioned from about 1 inch to about 3 inches below the floor surface 16. The first floor grating 20 may be of conventional design with a plurality of drain openings 21 extending therethrough to permit fire suppressant run off and debris to drain from the floor area 12. The second floor grating 22 is a preferred embodiment of a mounting assembly or device configured to support a nozzle assembly 28 of the present disclosure in a manner to permit the nozzle assembly 28 to deliver fire suppressant to the protected area 12 unhampered by aircraft, equipment, or other potential obstructions, as will be described in greater detail below.

The trench 14 includes a bottom wall 14*a*, and first and second opposed side walls 14*b* and 14*c*, with the bottom wall 14*a* spaced from the floor surface 16 to permit positioning of a supply pipe or line 24 in the trench 14 such that supply pipe 24 is spaced beneath floor surface 16. The first and second opposed side walls 14*b* and 14*c* are preferably spaced apart greater than a diameter of the supply pipe 24 to permit access to the supply pipe 24. In some embodiments, the first and second side walls 14*b* and 14*c* of the trench 14 can be spaced from about 18 inches to about 22 inches apart when the supply pipe 24 has a diameter of about 6 inches. The spacing of the first and second walls 14*b* and 14*c* is such that a person servicing the supply pipe 24 can generally stand on the bottom wall 14*a* and access the supply pipe 24. It should be understood, however, that these dimensions are only one example of a suitable configuration and are not intended to limit the scope of the present disclosure.

The supply pipe 24 can deliver fire suppressant to a plurality of nozzle assembly 28 which are positioned along the trench 14. For example, the supply pipe 24 can be filled with a supply of water or other firefighting liquid such as, for example and more preferably, a water/foam solution for delivery to the nozzle assemblies 28. Each nozzle assembly 28 is configured to disperse the fire suppressant, preferably as a foam, in a generally lateral radial pattern outwardly from the respective nozzle assembly 28 to provide a radial coverage of 360° or less (e.g., 180°—see FIG. 12, 90°—see FIG. 13, etc.). In some embodiments, the plurality of nozzle assemblies 28 can be positioned with 25 to 35 foot spacing between each nozzle assembly 28. The protected area 12 can be a 25 foot by 25 foot area. In a preferred embodiment, one or more of the supply pipes 24 delivers a water/FF foam solution to the plurality of nozzle assemblies 28. In some embodiments, the FF foam is generated from a solution using a 3% fluorine free foam concentrate, such as Enviro USP FF 3% foam concentrate by FOMTEC®, or Avio$^{F3}$ Green KHC FF 3% foam concentrate by NATIONAL FOAM®. The nozzle assembly is capable of generating an FF foam with an effective foam quality. As will be described below in greater detail, each of the nozzle assemblies 28 can deliver FF foam fire suppressant in a manner to minimize the height of the fire suppressant spray, while increasing throw distance. For example, a preferred nozzle assembly 28 can deliver fire suppressant over an area having a radius of approximately 25-26 feet with a maximum height in a range of about 12 inches to 18 inches. In some embodiments, each of the nozzle assemblies 28 deliver fire suppressant with a maximum height of 12 inches or less. The FF foam is applied by the nozzle assembly 28 to flammable liquid fires to suppress the fire by covering the fire with film that depletes oxygen and cools the fire to extinguish the fire. Moreover, as described herein, the nozzle assembly 28 includes preferred means for generating and distributing an FF foam having an effective foam quality in an upward sloping direction of a crowned floor at a distance of 25 feet or more.

As illustrated in FIG. 5, a nozzle assembly 28 is coupled to the supply pipe 24 by piping 30 and are supported by the second floor grating 22. The second floor grating 22 can be configured to support the weight of heavy equipment including aircraft, maintenance equipment, and normal heavy loads which could travel upon the second floor grating 22. The second floor grating 22 can be designed to mount the nozzle assembly 28 generally flush with the floor surface 16, includes a sufficient strength to support about 350 pounds per square inch or greater, and can include drainage and clearance to prevent blockage of nozzle assembly 28, as will be described in greater detail below.

Figure 6A:
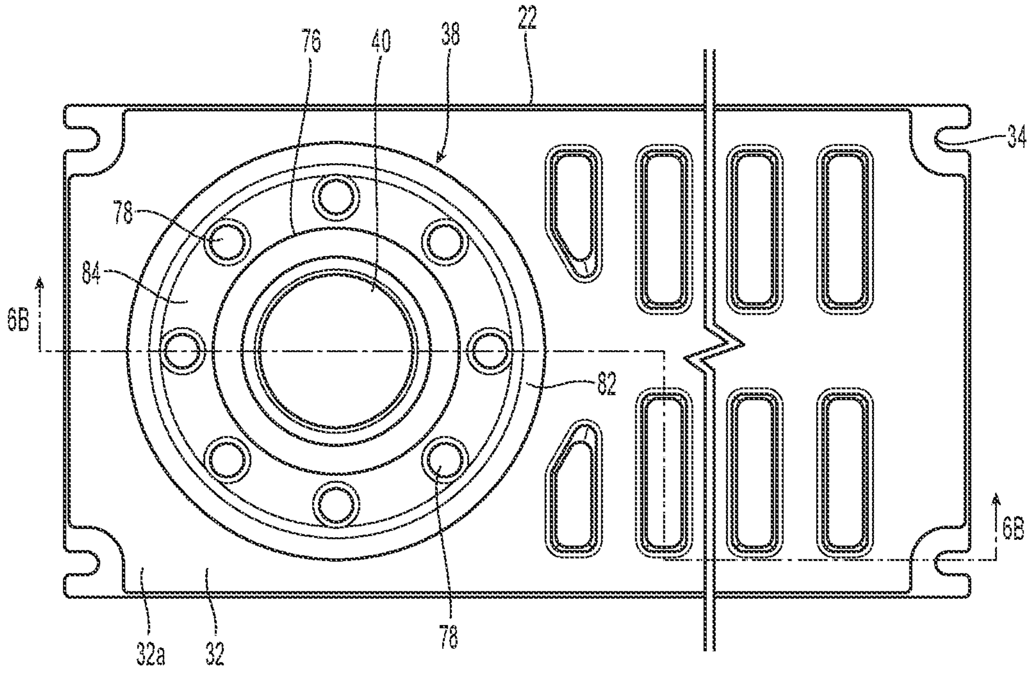
FIGS. 6A and 6B are a plan and side cross-sectional views, respectively, of the grating section of the fire suppressant system of FIGS. 1 and 2, showing a nozzle of the floor fire suppressant system removed.
Figure 6B:
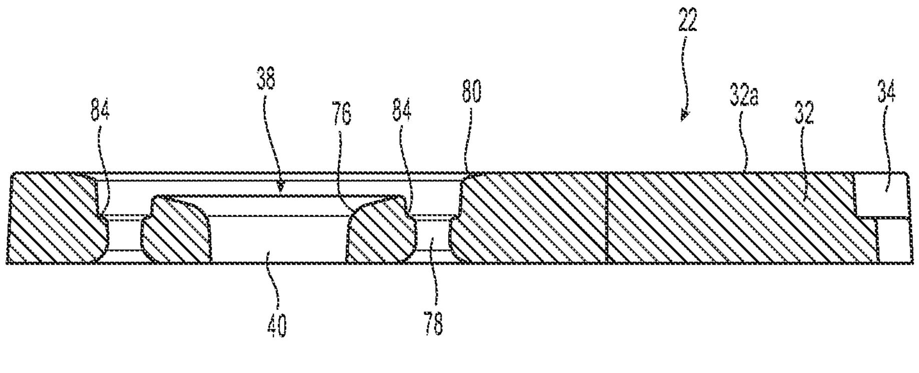

FIG. 6A is a top plan view of the second floor grating 22. The base 32 of the second floor grating 22 includes a recessed portion or cavity 38 with a centrally located transverse opening 40 which supports the nozzle assembly 28. FIG. 6B is a cross-sectional view taken along line 6B-6B in FIG. 6A, with the recessed portion or cavity 38 including an annular radiused support surface 76 on which a body flange 52 of the nozzle assembly 28 rests. The body flange 52 is generally radiused on a lower surface to correspond to the radiused surface 76 so that there is uniform support for the body flange 52 by the second floor grating 22. The base 32 can include a plurality of transverse drainage openings 78 which are positioned around the body flange 52 in an annular groove 84. The drainage openings 78 provide drainage of excess fire suppressant or debris to reduce obstruction to the nozzle assembly 28 so as not to interfere with the operation of the nozzle assembly 28. The tapered surface 76 can include a tapered annular outer perimeter surface 80 spaced radially outward from the nozzle assembly 28, which allows the fire suppressant spray to pass without obstruction from the nozzle assembly 28. In other embodiments, the nozzle assembly 28 can be positioned within any suitable enclosure, such as an enclosure embedded in the floor, a box, a frame, etc. and can omit the floor grating.

Figure 7A:
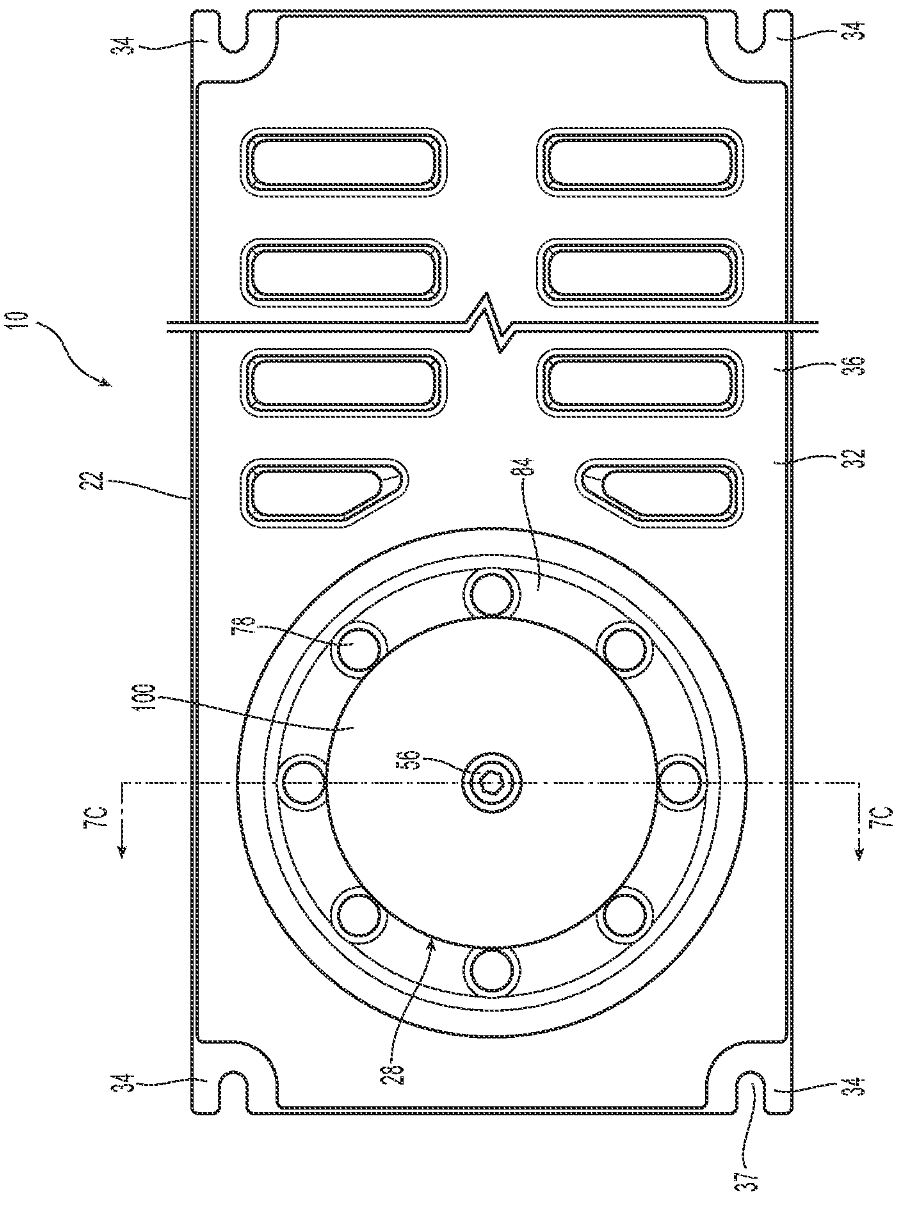
FIG. 7A is a plan view of the fire suppressant system of FIGS. 1 and 2, showing a nozzle and the grating section of the floor fire suppressant system in accordance with an embodiment of the present disclosure.

FIG. 7A is a top plan view of the nozzle assembly 28 positioned in the preferred mounting device of the second floor grating 22. The second floor grating 22 includes a solid base 32 which spans over trench 14 and rests on the support surfaces 18 such that the second floor grating 22 is flush or recessed below the floor surface 16. The base 32 includes an upper surface 36 which is generally flush with the floor surface 16 when the second grating 22 is supported on the support surfaces 18. As noted above, the base 32 can be rigidly supported on the support surfaces 18 and can include a plurality of recessed mounting openings 34, which each receive a bolt 37 for securing the second floor grating 22 to the support surfaces 18 of the trench 14.

Figure 7B:
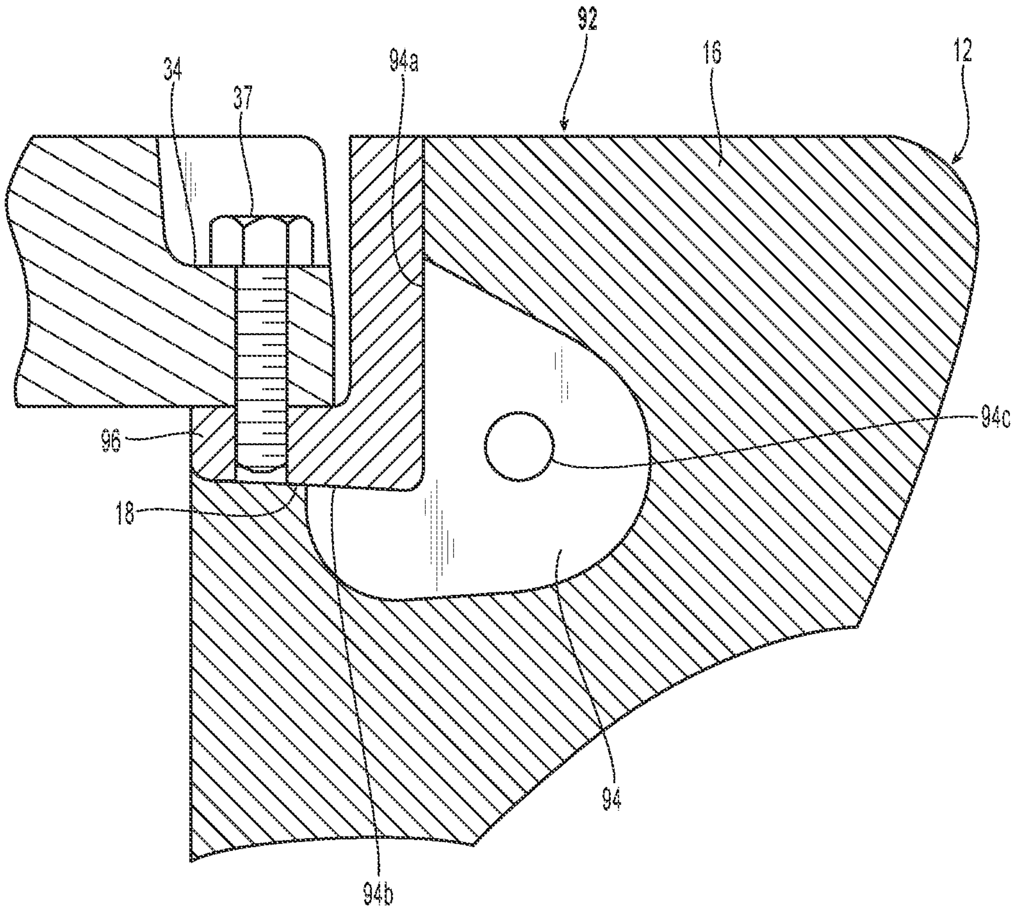
FIG. 7B is an enlarged view of a mounting system of the grating section of the fire suppressant system of FIGS. 1, 2, and 7A.

FIG. 7B is a cross-sectional side view of an embodiment of a mounting system for the second floor grating 22. The second floor grating 22 can be mounted to the support surfaces 18 by a "X" frame system 92. The "X" frame system 92 includes a pair of metal mounting tabs or angle arms 94 which are set in the concrete floor area 12 and include legs 94*a* and 94*b* which align with the vertical and horizontal walls of the shelf 18. The "X" frame system 92 further includes a metal mounting angle member 96 which is welded to the legs 94*a* and 94*b* of the respective angle arms 94. The base 32 is mounted to the mounting angle arms 96 by threaded fasteners, such as bolts 37, which extend through slotted recessed mounting opening 34 of the base 32, and which are positioned at opposed corners of the base 32 and into corresponding threaded openings provided in the angle arm 94. By use of the "X" frame system 92, the second floor grating 22 can be rigidly mounted and anchored to the floor area 12 on the shelves 18. It should be understood that other mounting arrangements may be used.

Figure 7C:
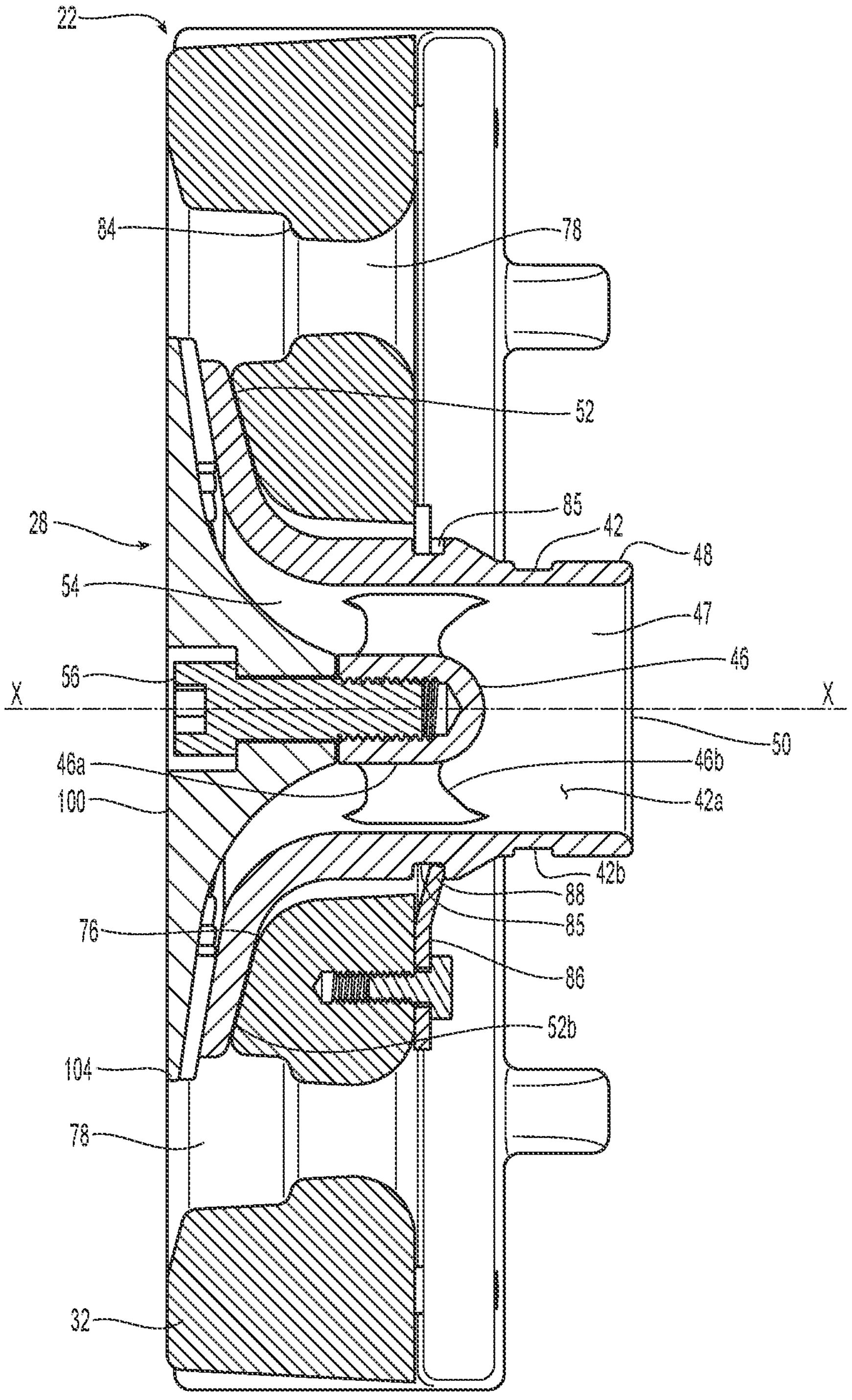
FIG. 7C is a cross-sectional view of the nozzle and the grating section of FIG. 7A.

FIG. 7C is a cross-sectional side view taken along line 7C-7C in FIG. 7A. As shown, the nozzle assembly 28 can be mounted in the base 32 in a generally flush configuration with respect to the upper surface 36 of base 32 so that the nozzle assembly 28 lies generally flush with floor surface 16 and will not project outwardly from the second floor grating 22 and, therefore, not form an obstruction for vehicles or the like travelling on the floor surface 16.

In the illustrated embodiment shown in FIGS. 7A and 7C, the nozzle assembly 28 includes an annular groove 85, which permits attachment of the nozzle assembly 28 to the second floor grating 22. In this manner, the nozzle assembly 28 may be permanently positioned in the floor area 12. Referring to FIG. 7C, the annular groove 85 receives one or more clips 86. The clips 86 are secured on one end to the base 32 and include a projecting flange 88 which extends into the annular groove 85 to secure the nozzle assembly 28 to the second floor grating 22. In this manner, the clips 86 locate and level the nozzle assembly 28 with the upper surface 36 of the base 32 and rigidly secure the nozzle assembly 28 to the second floor grating 22.

Still referring to FIG. 7C, the nozzle assembly 28 includes a base or body 42 and a deflector 100, which is engaged with and more preferably supported on a central web or support 46 of the body 42. When recessed in the cavity 38, the deflector 100 lies generally flush with the upper surface 36 of the base 32 and, further, with the floor surface 16. The body 42 includes an internal transverse passage 47 which extends along a central nozzle axis X-X and defines an inlet opening 50 and an outlet opening 54 and includes a mounting portion 48, which is in communication with the supply pipe 24 through the delivery pipe or line 30. The mounting portion 48 is preferably threaded or grooved for coupling to the delivery pipe 30. The body 42 further includes a body flange portion 52 which extends around the outlet opening 54 and is axially spaced from the mounting portion 38 with the internal transverse passage extending therebetween along the central nozzle axis. The body flange 52 supports the nozzle assembly 28 in the recessed cavity 38, as will be more fully described below.

Figure 8A:
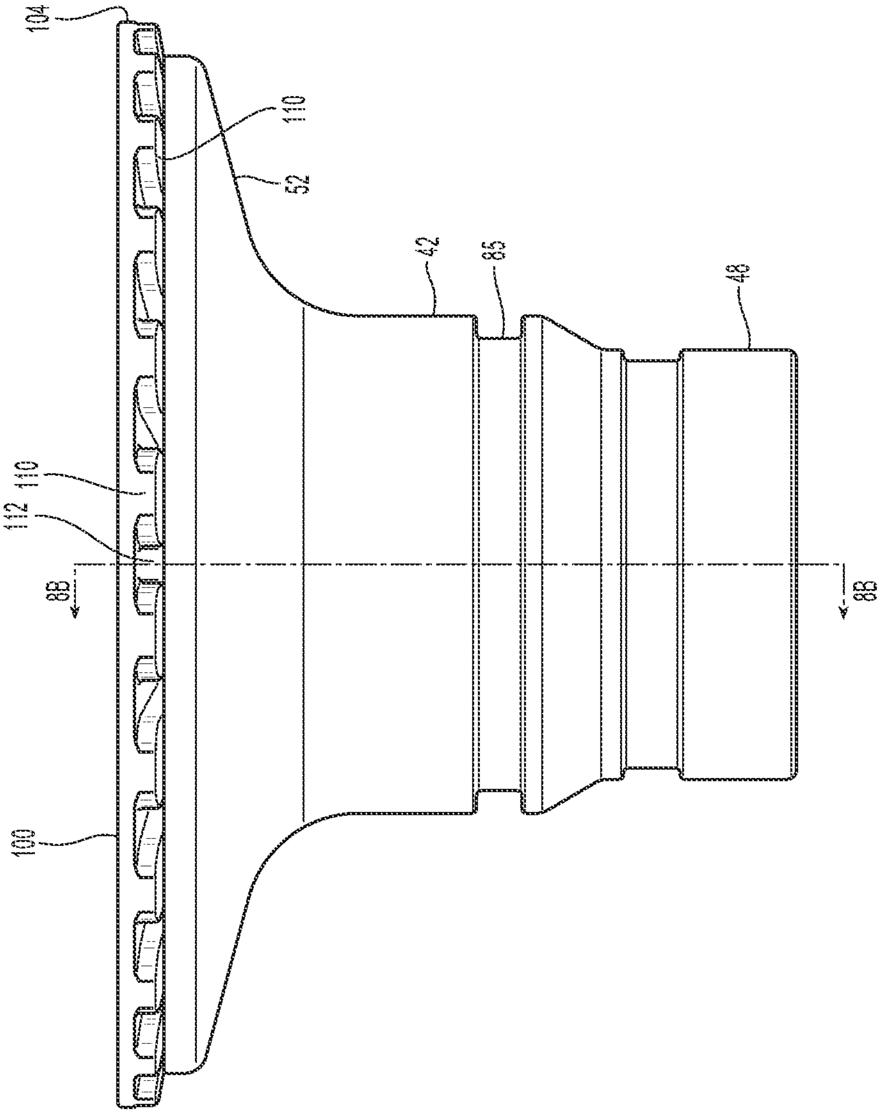
FIGS. 8A and 8B are elevation and cross-sectional elevation views, respectively, of the nozzle of FIG. 7A.
Figure 8B:
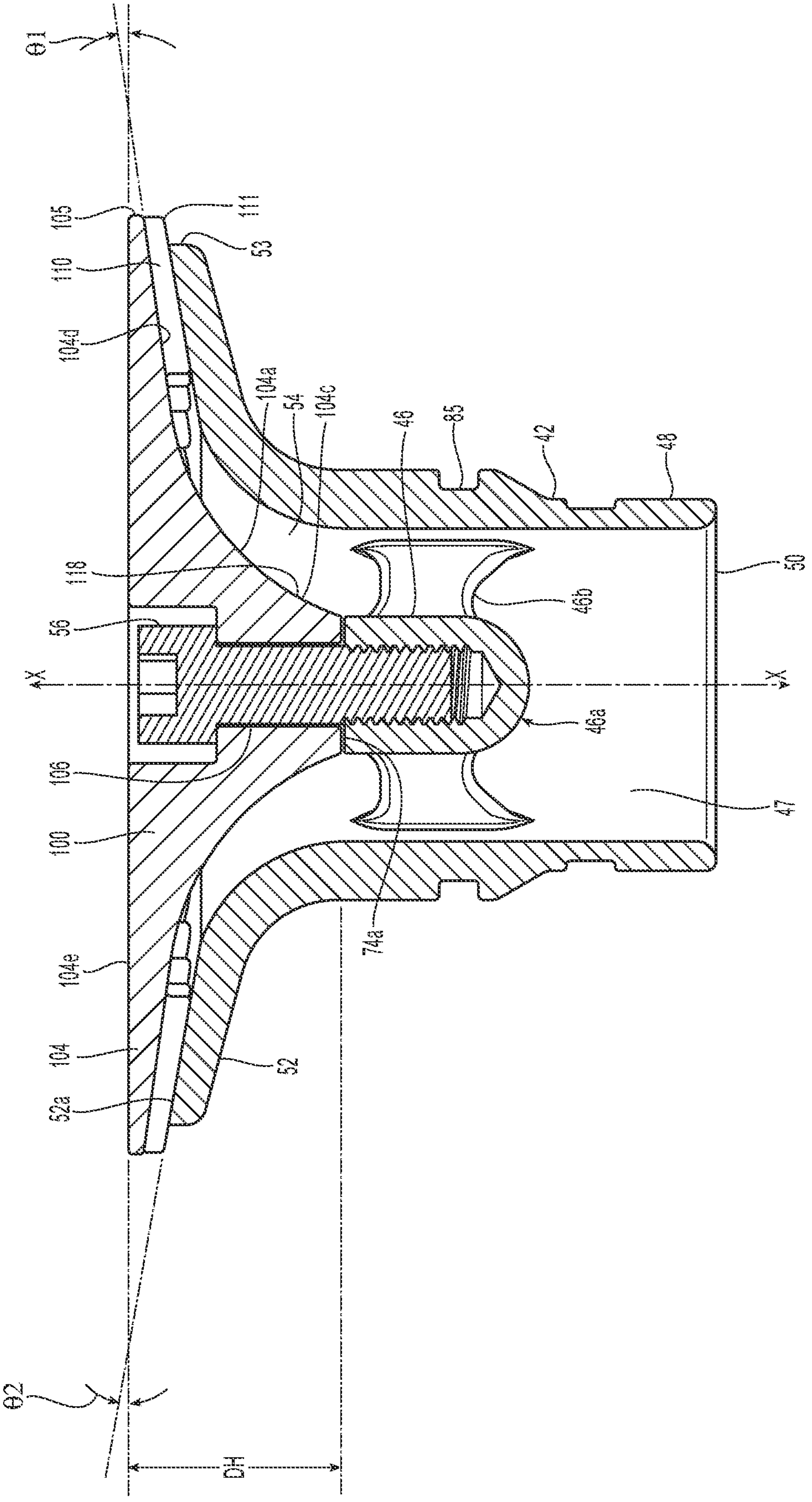

FIGS. 8A and 8B are side and cross-sectional views, respectively, of the body 42 and the deflector 100 assembled to the body 42. The deflector 100 includes a deflector flange 104 which is spaced from the outlet opening 54. The deflector flange 104 is substantially solid except for a central mounting opening described below and is, therefore, substantially impervious and provides a solid deflecting surface for the fire suppressant. To further deflect and, moreover, direct the fire suppressant, the deflector 100 includes a plurality of projecting members 110 which extend from the deflector flange 104 toward the body flange 52 of the body 42 and which preferably rest on an upper support surface 52*a* of the body flange 52. By resting on the body flange 52, the projecting members 110 provide support to the deflector 100. The body 42, the preferred deflector 100 and/or intermediate components therebetween provide a preferred means for generating and distributing a foam and more particularly, an FF foam from an FF foam solution in a preferred manner as described herein. The preferred generating and distribution means include a plurality of radially transverse passageways 112 as described herein through which the fire-fighting foam solution flows and exits as a fire suppressant foam to form the generally lateral radial pattern for delivering the foam to a protected area.

The deflector 100 is mounted to the central support 46 by a mounting web 118 adjacent to an upper surface 74*a* of the central support 46 and secured with a threaded fastener 56 which extends through a central mounting opening 106 and the mounting web 118, where the fastener 56 is preferably counter sunk in the central opening 106 of the deflector 100. The deflector 100 has a deflector height DH between the bottom of the mounting web 118 and the top of the deflector flange 104. In some embodiments, the deflector height DH is about the same length as the height of the deflectors of the current technology. Providing some of the preferred embodiments with deflector heights DH the same as the known technology allows the preferred embodiment to be utilized with the existing nozzle body and floor grating, thereby allowing for current systems using AFFF to be converted to FF with only a change in the deflector. The mounting web 118 is preferably shaped to minimize friction loss of the preferred fire suppressant solution exiting from the outlet opening 54. Preferably, a resilient washer material is placed between the mounting web 118 and the support web 46, which prevents rotation of the deflector 100 due to human contact and, furthermore, due to torque loads which may be caused from vehicles; however, the resilient washer material preferably breaks free to permit rotation to prevent damage to the nozzle assembly 28 in the event that heavy torque loads caused from turning or accelerating vehicles are applied. In the illustrated embodiment, the central web 46 comprises a cylindrical body 46*a*, which is preferably centrally located in the body 42 and in the passage 47 and is supported in the passage 47 by radial arms 46*b*. Some embodiments have six radial arms 46*b*. It should be understood, however, the number of radial arms 46*b* may be modified. The radial arms 46*b* extend from the cylindrical body 46*a* to the inner surface 42*a* of the body wall 42*b* (FIG. 7C). The central web 46 is also preferably shaped to minimize friction loss of the fire suppressant solution flowing through transverse passage 47.

Figure 9A:
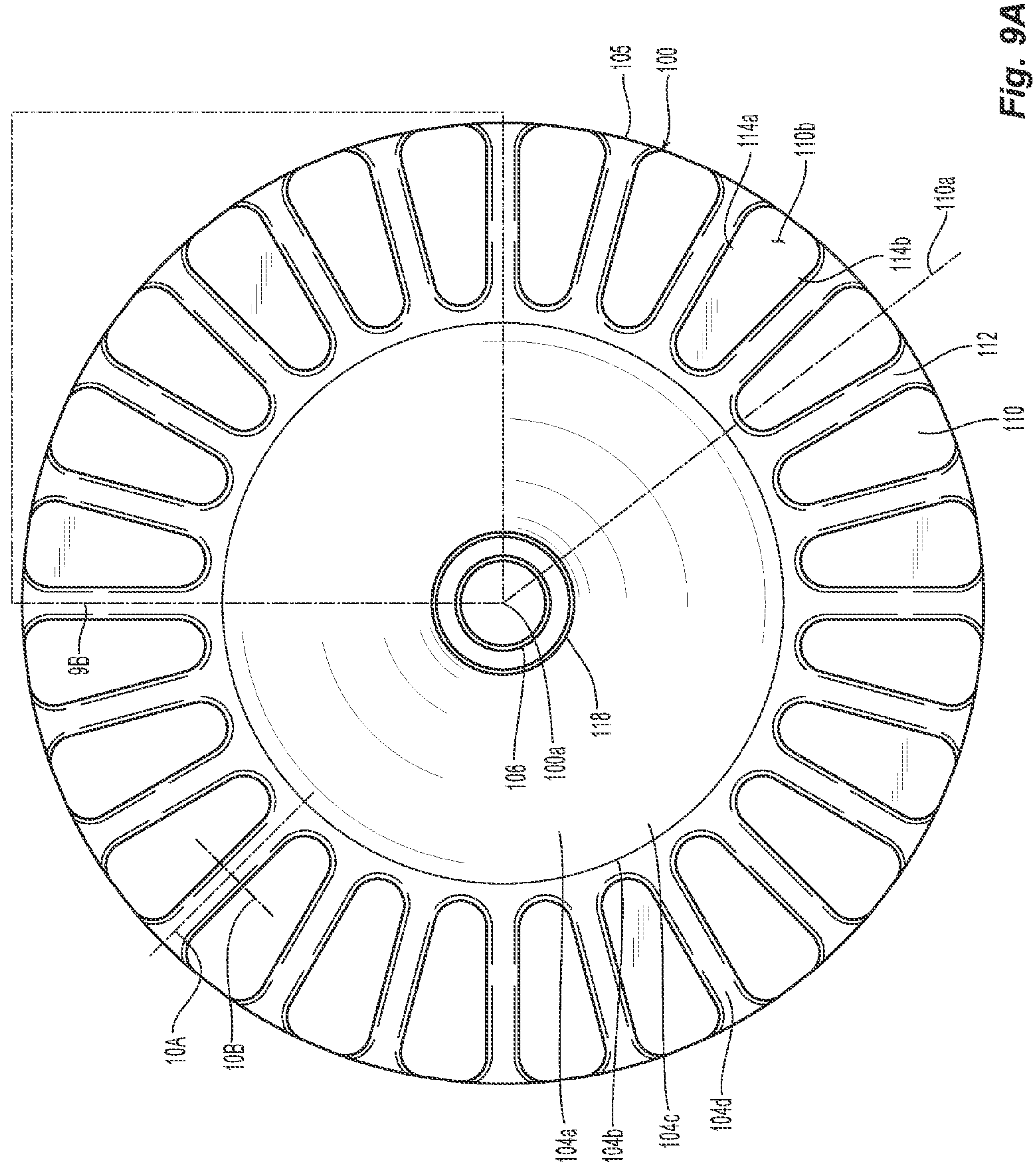
FIGS. 9A and 9B are bottom and bottom detail views, respectively, of a deflector of the nozzle of FIG. 7A.
Figure 11:
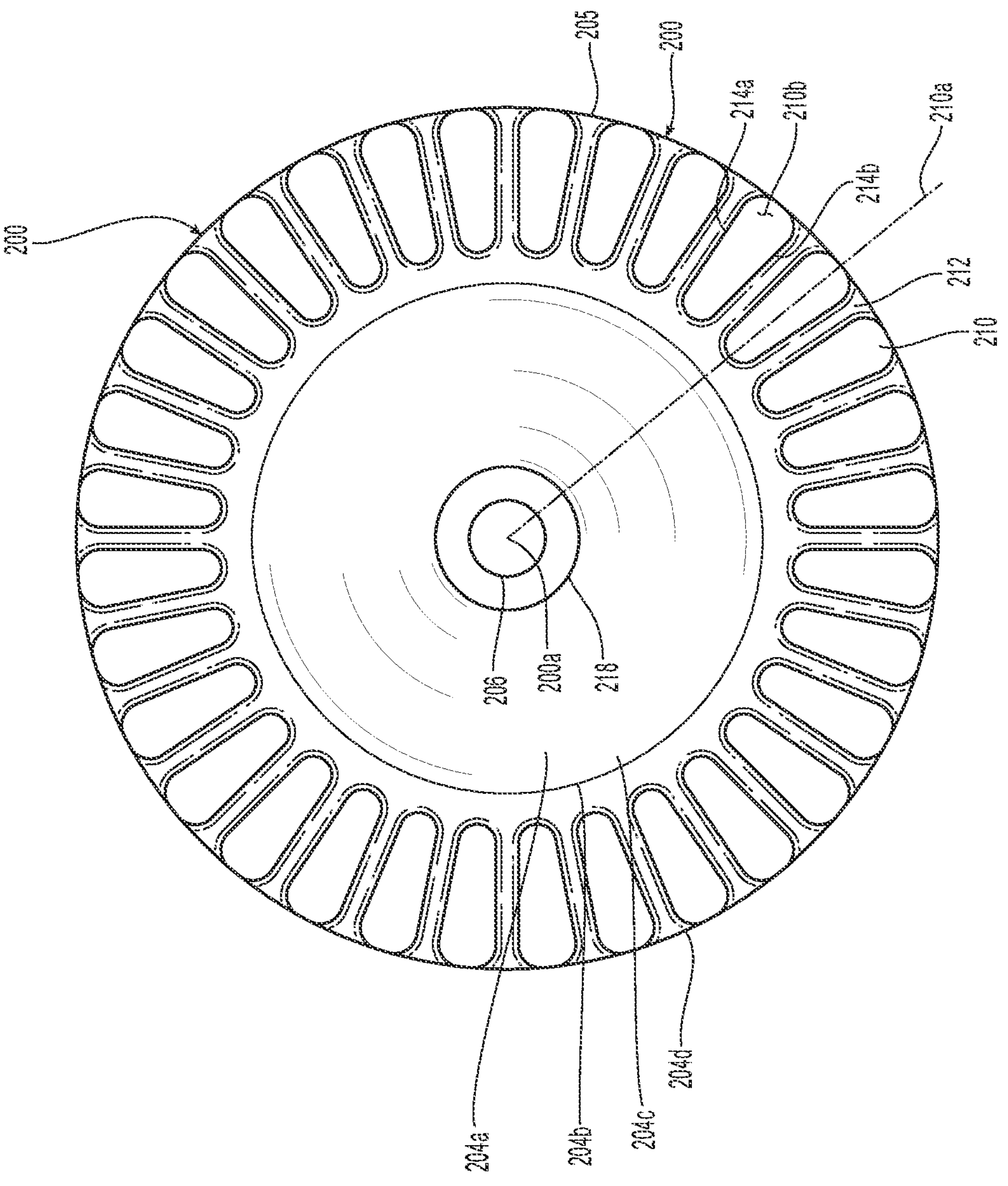
FIGS. 11-13 are bottom views of deflectors in accordance with embodiments of the present disclosure.

FIG. 9A is a bottom view of the deflector 100. The deflector 100 includes the projecting members 110 generally aligned along lines 110*a* radially outward from a central axis 100*a* of the deflector 100. In a preferred form, the deflector 100 has 24 projecting members 110 evenly positioned circumferentially around the deflector. In other embodiments, the deflector 100 can have any number of projecting members 110 (e.g., 32 deflecting members as shown in FIG. 11), or can have projecting members 110 only positioned on the deflector 100 around a portion of the circumference (e.g., the deflectors 300 and 400 shown in FIGS. 12 and 13, respectively). The projecting members 110 are radially elongate in shape with the elongate length aligned along the respective lines 110*a*. The projecting members 110 can be spaced to provide multiple spray jets projecting radially around at least a portion of an outer circumference of the deflector 100, with each spray jet providing a high velocity FF foam that covers the protected area 12. The arrangement of the spray jets can provide a solid pattern and multiple droplet size for uniform distribution of the foam on the protected area 12.

Although the figures show each deflector having a plurality of projecting members with each member having a generally uniform shape and circumferential distribution, in other embodiments, the projecting members of a single deflector can have non-uniform shapes, sizes, and/or varied circumferential spacing to project a different stream density (e.g., a shorter or longer lateral distance between streams) in any direction. For example, in some embodiments where the protected area is rectangular, the deflector can have greater stream density in directions toward the corners of the protected area to project a greater volume of fire suppressant toward the longer radial distance point of the protected area. In other embodiments where the protected area is rectangular, the deflector can have greater stream density in directions perpendicular to the edges of the protected area, among other configurations which are within the scope of the present disclosure.

Each projecting member 110 includes a planar bearing surface 110*b* for resting on the body flange 52, and side walls 114*a* and 114*b* which define the passageways 112 therebetween. Although the projecting members 110 are disposed between the lower surface 104*a* and the upper surface 52*a* and are shown as extending from and coupled to a lower surface 104*a* of the deflector flange 104, in other embodiments, the projecting members 110 can extend upward from the body flange 52, can extend from a combination of the lower surface 104*a* and the body flange 52 (e.g., in an alternating arrangement), or can be individual components attached to the deflector flange 104 or the body flange 52 via fasteners. The projecting members 110 can have various fillets 111, 111*a* at the interface between the projecting members 110 and the lower surface 104*a* of the deflector flange 104, around the transition from the side walls 114*a* and 114*b* to the planar bearing surface 110*b*, etc. to provide smooth transitions for the fire suppressant flow, for durability, to decrease manufacturing defects at sharp corners, for tooling longevity, etc.

Figure 9B:
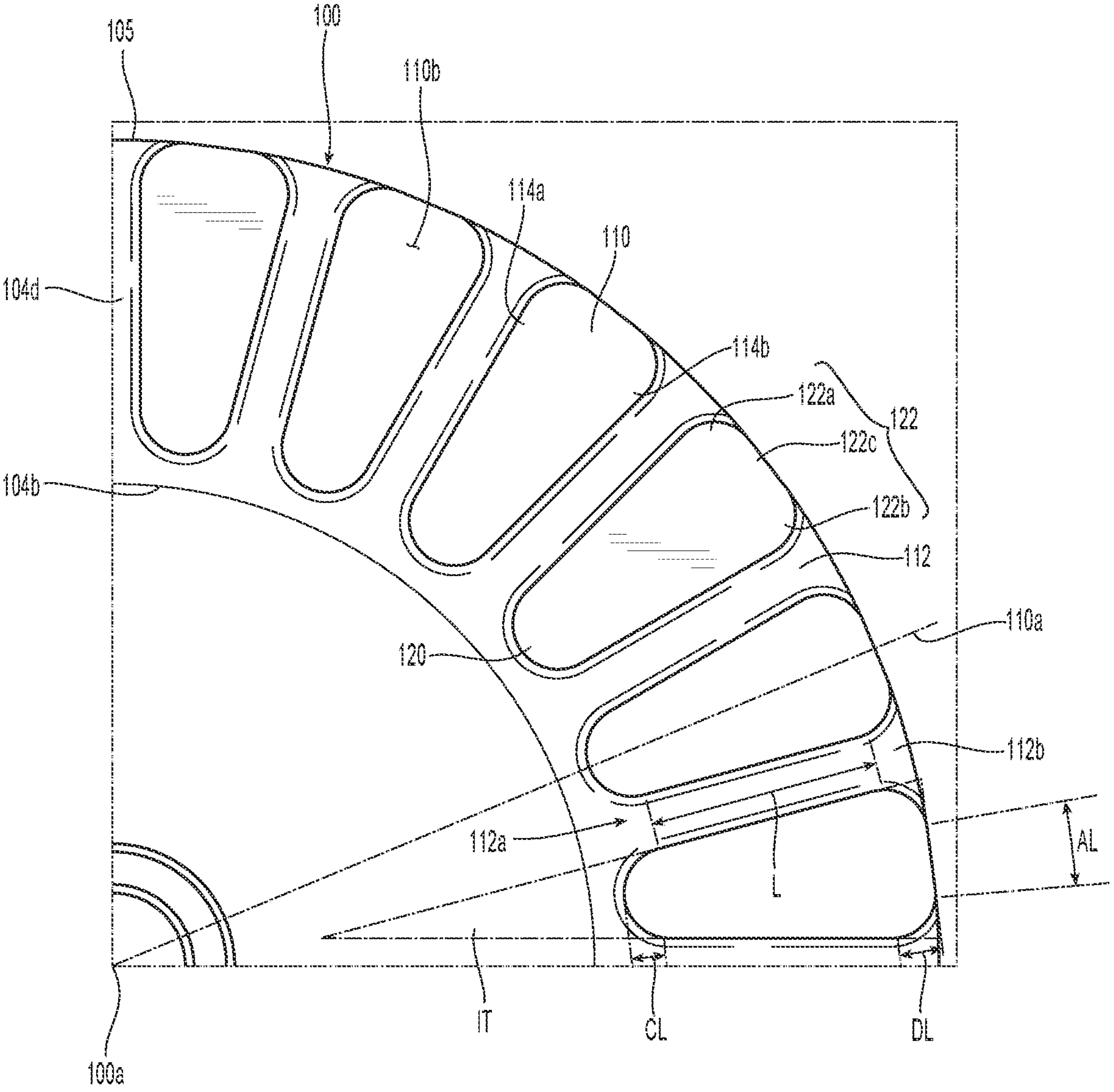

FIG. 9B is a detail bottom view of the portion of the deflector 100 shown in the detail box of FIG. 9A. The projecting members 110 include a radial inner portion 120 and a radial outer portion 122, which respectively preferably define semi-circular or radiused inward ends 120 and semi-circular or radiused outward ends 122, with the outward ends 122 being generally aligned with an outer perimeter 105 (the outer circumference 105) of the deflector flange 104. In a preferred embodiment, the inward end 120 of each projecting member 110 is semi-circular and the outward end 122 has radiused first and second curved edges 122*a* and 122*b*, with a third curved edge or section 122*c* positioned therebetween. In some embodiments, the third curved edge 122*c* of each of the plurality of projecting members 110 has a curvature that is different and more preferably greater than each of the first and second curved edges 122*a* and 122*b*. In a preferred embodiment of the deflector 100, the third curved edge 122*c* spans an arc length AL of ten to fifteen degrees (10°-15°) about the central nozzle axis X-X. In some embodiments, the section 122*c* of each of the plurality of projecting members 110 has a radius that matches the radius of the outer circumference 105 of the deflector 100. In this arrangement, the radius of the semi-circular inward end 120 is larger than the radius of the first and second curved edges 122*a* and 122*b* so that the side walls 114*a* and 114*b* extend further along respective radial lines 110*a* toward the outer perimeter 105, creating a longer section of the passageway 112 with a radial length L of the passageway 112 and a constant width W between adjacent projecting members 110 (FIG. 10B), which will be explained in greater detail below. Based on the above configurations, if the side walls 114*a* and 114*b* and the section 122*c* of each projecting member 110 are extended linearly until each line intersects, the resulting shape would have an isosceles triangular profile IT with the two legs of the isosceles triangle of equal length along the side walls 114*a* and 114*b* converging at an apex, with the base of the isosceles triangle generally extending along the section 122*c* of the outward end 122. Accordingly, in a preferred aspect, the radiused first and second curved edges 122*a* and 122*b* have a common radius.

Each passageway 112 is defined by adjacent projecting members 110 and the lower and upper surfaces 104*a* and 52*a*, with the adjacent inward ends 120 defining a converging inlet portion 112*a*, and the adjacent first and second curved edges 122*a* and 122*b* defining a diverging outlet portion 112*b* positioned at a terminal end of each passageway 112. In configurations where the radius of the inward ends 120 is larger than the radius of the first and second curved edges 122*a* and 122*b*, a convergent length CL of the converging inlet 112*a* is shorter than a divergent length DL of the diverging outlet 112*b*. The length of the section 122*c* determines the radii of the first and second curved edges 122*a* and 122*b*, and in that regard a longer circumferential length of the section 122*c* results in a shorter divergent length DL. In some embodiments, the ratio of the convergent length CL to the divergent length DL is from about 1:1.1 to 1:1.2, and preferably 1:1.16. In other embodiments, the ratio of the convergent length CL to the divergent length DL is from about 1:1.2 to 1:1.3, and preferably 1:1.26. The inward end 120 and the first and second curved edges 122*a* and 122*b* can produce a venturi effect between each projecting member 110, which pulls the fire suppressant pattern together through the passageways 112 to form a uniform distribution of preferably of a fire suppressant foam and, furthermore, provides a foam with multiple fire suppressant droplet sizes and velocities. From the foregoing description, it can be appreciated that the nozzle 28 has no moving parts. Furthermore, the deflector 100 is supported by the projecting members 110 and the mounting web 118 and, therefore, has uniform support at its outer edge and center which results in the deflector 100 being able to accept heavy vertical weight.

Referring again to FIG. 9A, the inner surface 104*a* of the deflector flange 104 transitions at a transition point 104*b* from a radiused portion 104*c* upstream of the outlet opening 54 to a linear portion 104*d* downstream of the outlet opening 54, each shape when viewed in cross-section (FIG. 8B). In this regard, the radiused portion 104*c* forms a generally curved frustoconical surface and the linear portion 104*d* forms a generally linear frustoconical surface. Preferred embodiments of the deflector flange 104 include an upper surface 104*e* disposed normal to the central nozzle axis X-X with the lower surface 104*a* angled with respect to the upper surface 104*e*. In a preferred embodiment of the nozzle assembly 28, the support surface 52*a* of the body flange 52 is also angled with respect to the upper surface 104*e* of the deflector flange 104 with the lower surface 104*a* of the deflector flange 104 being at an angle θ1 that is less than the angle θ2 of the support surface 52*a* of the body flange 52, as seen in FIG. 8B. With the outer perimeter 105 of the deflector between the upper surface 104*e* and the lower surface 104*a* circumscribing the nozzle axis X-X, the deflector flange 104 defines the preferred linear frustoconical portion of the deflector that extends radially inward at a radial length from the outer perimeter 105. In some embodiments, the radial length of the linear portion 104*d* is from about 1.24 inches to 1.26 inches and the radial length of the projecting member 110 is from about 1.12 inches to 1.13 inches. In these embodiments, the ratio of the radial length of the projecting member 110 to the radial length of the linear portion 104*d* is from about 1:1.097 to 1:1.125, and preferably 1:1.11. The projecting members 110 extends from the outer perimeter 105 radially inward at a radial length that is preferably equivalent to a majority, i.e., over 50%, of the radial length of the linear portion 104*d* of the frustoconical portion. In some embodiments, the projecting member 110 extends from the outer perimeter 105 radially inward with a radial length that is more preferably at least 70%, at least 80%, or at least 90% of the radial length of the linear portion 104*d*. In a preferred embodiment, the projecting member 110 extends from the outer perimeter 105 radially inward with a radial length 90% of the radial length of the linear portion 104*d*. In another preferred embodiment, the projecting member 110 extends from the outer perimeter 105 radially inward with a radial length 80% of the radial length of the linear portion 104*d*. The linear portion 104*d* can be angled upward to radially direct the flow of the fire suppressant above the floor area 12, in a manner to maintain a maximum lateral trajectory, and to minimize the height of the spray from the floor area 12. In preferred form, the maximum height of the spray is in a range of about 12 inches to 18 inches and, more preferably, less than 12 inches.

Figure 10A:
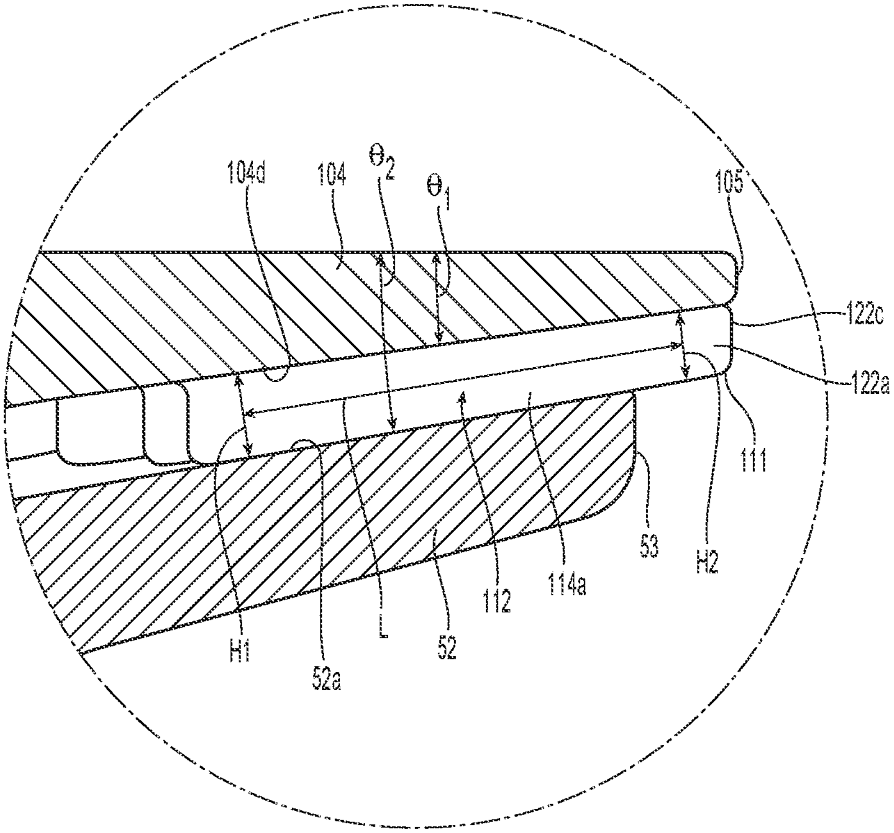
FIGS. 10A and 10B are detail cross-sectional views of a passageway of the nozzle of FIG. 7A.
Figure 10B:
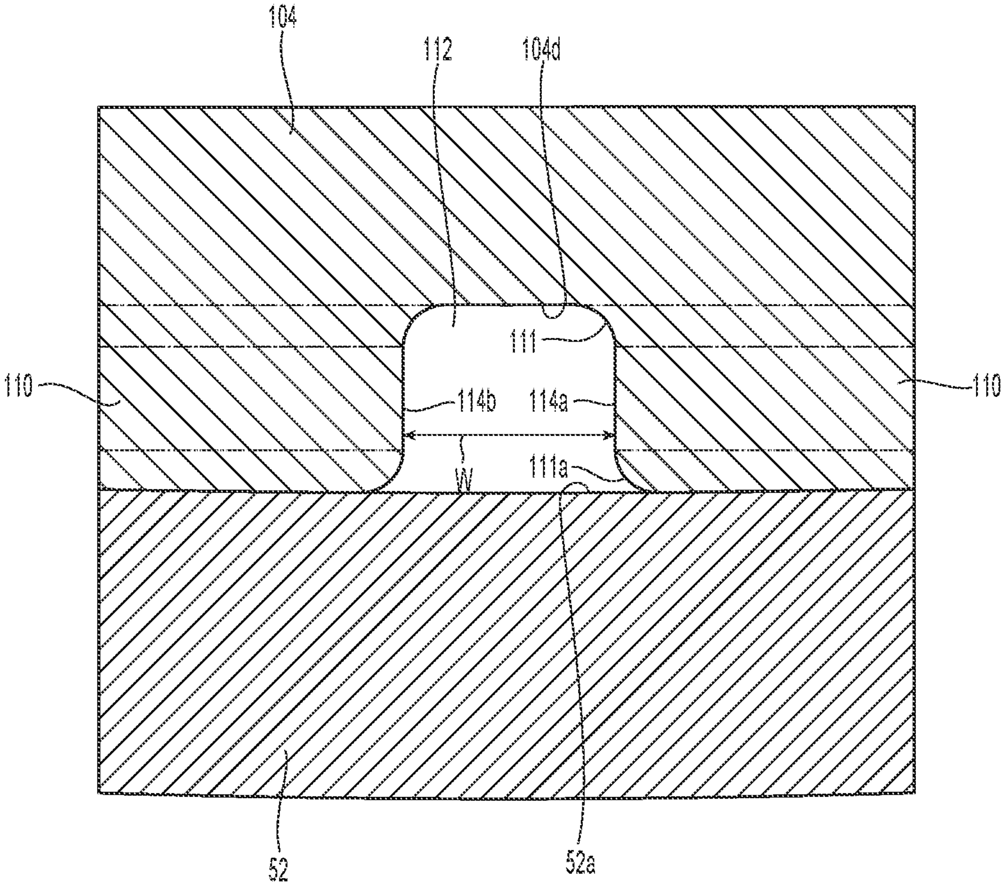

FIGS. 10A and 10B are cross-sectional detail views, as indicated by cross-section lines in FIG. 9A, showing the passageways 112 formed between the projecting members 110, the linear surface 104*d* of the lower surface 104*a*, and the upper surface 52*a* of the body flange 52. FIG. 10A shows a side view arranged along the radial length L of the passageway 112, and FIG. 10B shows a view normal to the radial length L at an intermediate position of the passageway 112 between the side walls 114*a* and 114*b*. Although the passageways 112 are shown and described as being preferably formed by the space between the surfaces of the body 52, the deflector 100 and its projecting members 110, it should be understood that the radially extending passageways 112 can also be formed by internal surfaces of the body, deflector and/or any intermediate component of the nozzle assembly 28 arranged to define the preferred passageways 112 and provide the preferred means of foam generation and distribution.

Referring to FIG. 10A, in preferred form, the linear portion 104*d* of the lower surface 104*a* of the deflector flange 104 has an angle $\theta_1$ in a range of 6 to 10 degrees from horizontal (as used herein horizontal refers to the upper surface of the deflector 100), and more preferably, approximately 8 degrees from horizontal. Similarly, the upper surface 52*a* of the body flange 52 has an angle θ2 in a range of 8 to 12 degrees from horizontal, more preferably approximately 10 degrees from horizontal to create a converging configuration between the lower surface 104*a* and the upper surface 52*a* in a radially outward direction along the passageway 112. Thus, the lower surface 104*a* of the deflector flange 104 and the upper surface 52*a* defines therebetween the height H of the passageway 112 and preferably, the variably height H1, H2 of the passageway 112. The passageway 112 has a height H1 at a radially inward edge of the side wall 114*a* (i.e., at the end of the convergent length CL opposite the inward end 120), and a height H2 at a radially outward edge of the side wall 114*a* (i.e., at the end of the divergent length DL opposite the outer end 122), where, in a preferred form, the height H1 is larger than the height H2 based on the converging configuration of the lower surface 104*a* and the upper surface 52*a* (at a rate of the difference between 01 and 02). As shown, an outer perimeter 53 of the body flange 52 can be positioned radially inward from the outer perimeter 105 of the deflector flange 104. In other embodiments, the outer perimeter 53 can be generally aligned with the outer perimeter 105. In some embodiments, the spray has a maximum lateral distance of approximately 20 to 24 feet and fills a 25 ft by 25 ft test area in about 1 minute with at least 0.1 density of fire suppressant material.

In some embodiments, the ratio of the height H2 to the height H1 is from about 1:1.2 to 1:1.3, and preferably about 1:1.254. In some embodiments, the ratio of the height H2 to the height H1 is from about 1:1.15 to 1:1.25, and preferably about 1:1.205. In other embodiments, the ratio of the cross-sectional area of the passageway 112 at the entrance of the diverging outlet 112*b* to the overall height of the deflector 100 is from about 1:40 to 1:50, and preferably about 1:44. In other embodiments, the ratio of the cross-sectional area of the passageway 112 at the entrance of the diverging outlet 112*b* to the overall height of the deflector 100 is from about 1:50 to 1:60, and preferably about 1:57.

Referring to FIG. 10B, in a preferred form, the passageway 112 has a width W between the side walls 114*a* and 114*b* of adjacent projection members 110, where the width W is constant along the length of the passageway 112 from the radially inward edge of the side walls 114*a* and 114*b* and the radially outward edge of the side walls 114*a* and 114*b* (i.e., the side walls 114*a* and 114*b* are parallel planar). In some embodiments, the minimum height of the passageway 112 (e.g., at the outer perimeter 53) is ⅛ inch, and the minimum width of the passageway (e.g., the width W between the side walls 114*a* and 114*b*) is ⅛ inch to allow use of the nozzle 28 with a ⅛ inch strainer on the fire suppressant supply, e.g., at the supply pipe 24. In some embodiments, the converging configuration between the lower surface 104*a* and the upper surface 52*a* in a radially outward direction along the passageway 112 and the constant width W along the length of the passageway 112, in combination with the cross-sectional area of the passageway 112, causes an increase in momentum of the stream traveling through the passageway 112, defined by the mass multiplied by the velocity at the diverging outlet 112*b*. In some embodiments, the ratio of the height of the projecting member 110 at the entrance of the diverging outlet 112*b* to the width of the passageway 112 is from about 1:1.3 to 1:1.4, and preferably about 1:1.34. In other embodiments, the ratio of the height of the projecting member 110 at the entrance of the diverging outlet 112*b* to the width of the passageway 112 is from about 1:1 to 1:1.1, and preferably about 1:1.03.

In the embodiments disclosed herein, the deflector flange 104 is thinner along the linear surface 104*d* such that the projecting member 110 height can be taller without increasing overall height of the nozzle 28. In some embodiments, the ratio of the thickness of the deflector flange 104 at the outer circumference 105 to the height of the projecting member 110 at the entrance of the diverging outlet 112*b* is from about 1:1.5 to 1:1.7, and preferably about 1:1.61. In some embodiments, the ratio of the thickness of the deflector flange 104 at the outer circumference 105 to the height of the projecting member 110 at the entrance of the diverging outlet 112*b* is from about 1:1.5 to 1:1.7, and preferably about 1:1.63.

FIG. 11 is a bottom view of a deflector 200 in accordance with embodiments of the present disclosure. The deflector 200 is generally similar in form to the deflector 100 described above, but includes a different projecting member configuration—having 32 projecting members 210 as opposed to 24 projecting members 110. The deflector 200 is shown in FIG. 11 with similar features to the deflector 100, but in the 200-series. Based on the number of projecting members 210, the width of each passageway 212 can be smaller than the passageways 112 of the deflector 100, although, the height of the passageways 212 is generally similar to the passageways 112.

Figure 12:
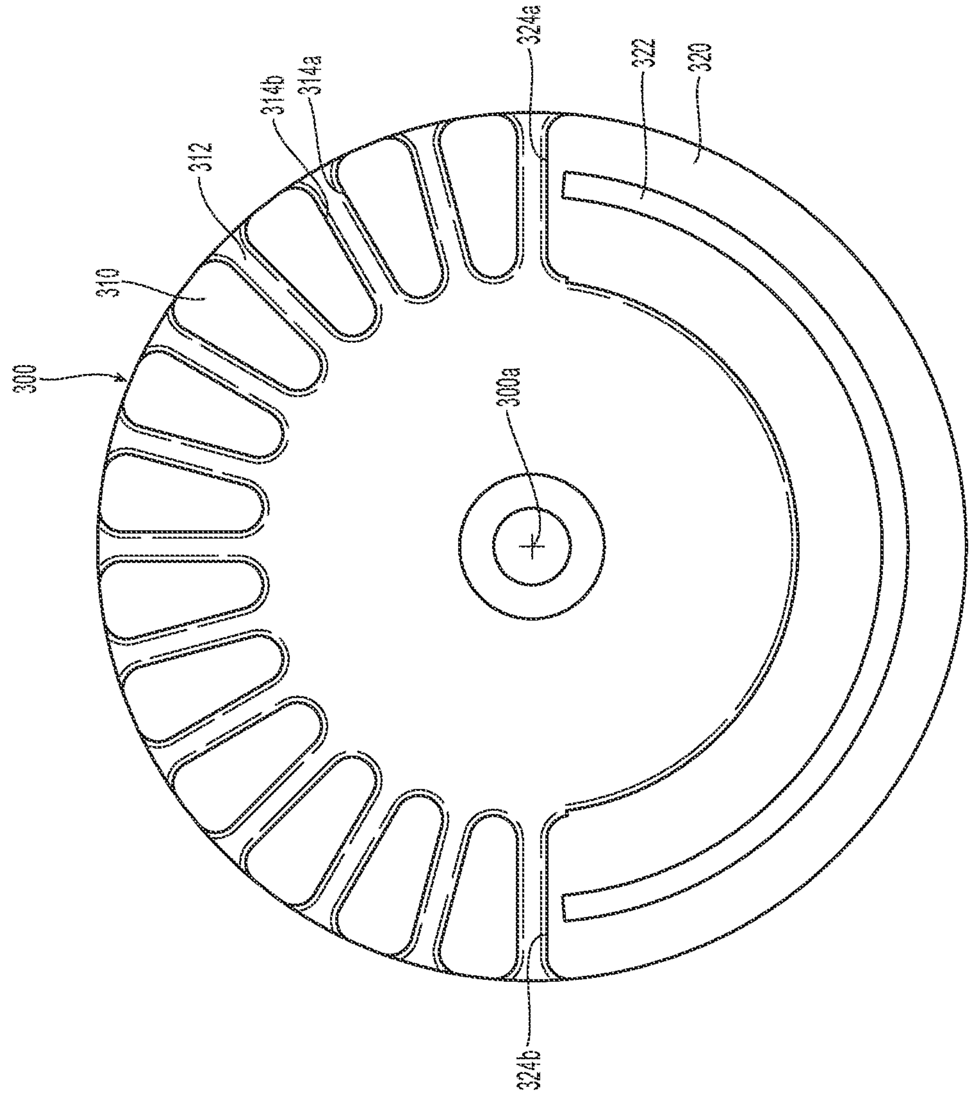

FIG. 12 is a bottom view of a deflector 300 in accordance with embodiments of the present disclosure. The deflector 300 is generally similar in form to the deflector 100 described above, but is configured to provide about 180° of radial coverage of fire suppressant as opposed to 360° of radial coverage of fire suppressant for the deflector 100. The deflector 300 is shown in FIG. 12 with similar features to the deflector 100, but in the 300-series. The deflector 300 includes projecting members 310, having passageways 312 therebetween, and a blocking member 320. The blocking member 320 can be configured to occlude the flow of fire suppressant along the circumferential arc length of the blocking member 320, which is about 180° around a central axis 300*a* in the illustrated embodiment of FIG. 12. The blocking member 320 has side walls 324*a* and 324*b* at first and second circumferential ends of the blocking member 320, which together with the sidewalls 314*a* and 314*b* of the projecting members 310, define the passageways 312 adjacent to the blocking member 320. The blocking member 320 can further include a groove 322 configured to retain a sealing gasket therein (not shown) for forming a seal between the deflector 300 and the upper surface 52*a* of the body flange 52 and preventing fire suppressant leakage past the blocking member 320.

Figure 13:
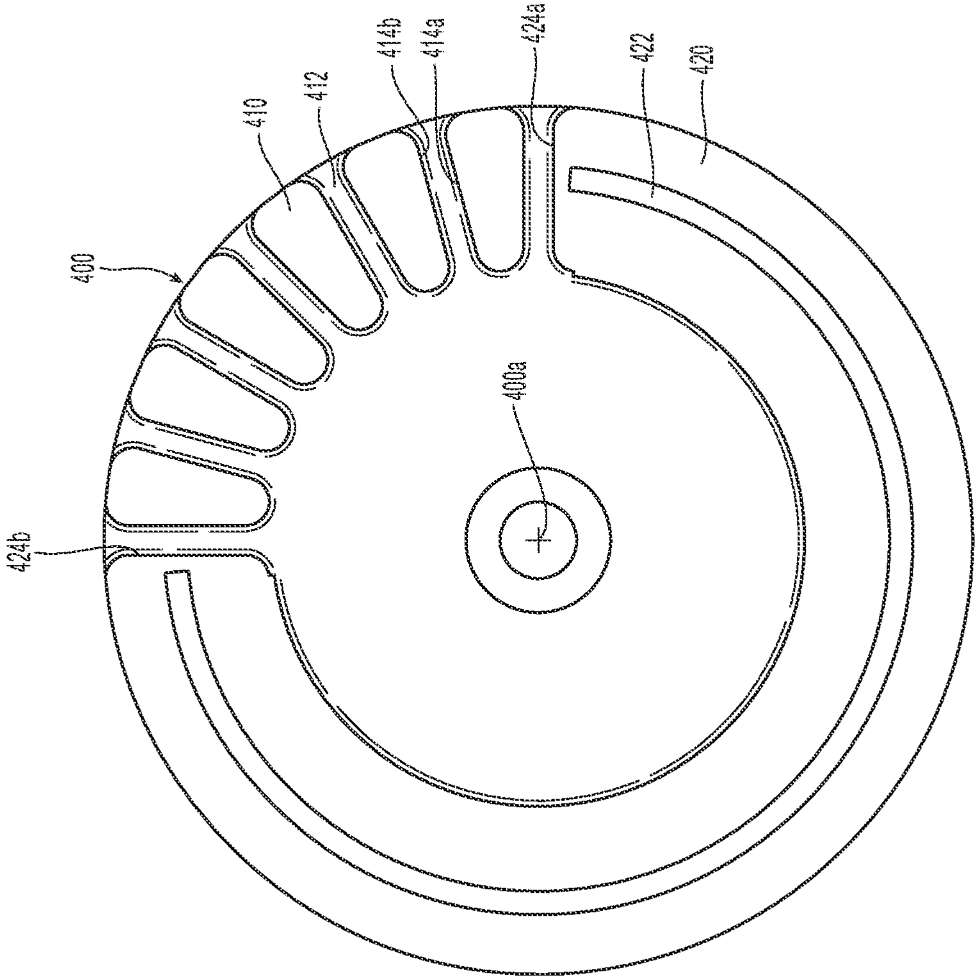

FIG. 13 is a bottom view of a deflector 400 in accordance with embodiments of the present disclosure. The deflector 400 is generally similar in form to the deflectors 100 and 300 described above, but is configured to provide about 90° of radial coverage of fire suppressant as opposed to 360° and 180° of radial coverage of fire suppressant for the deflectors 100 and 300, respectively. The deflector 400 is shown in FIG. 13 with similar features to the deflectors 100 and 300, but in the 400-series. The deflector 400 includes projecting members 410, having passageways 412 therebetween, and a blocking member 420. The blocking member 420 can be configured to occlude the flow of fire suppressant along the circumferential arc length of the blocking member 420, which is about 270° around a central axis 400*a* in the illustrated embodiment of FIG. 13. The blocking member 420 has side walls 424*a* and 424*b* at first and second circumferential ends of the blocking member 420, which together with the sidewalls 414*a* and 414*b* of the projecting members 410, define the passageways 412 adjacent to the blocking member 420. The blocking member 420 can further include a groove 422 configured to retain a sealing gasket therein (not shown) for forming a seal between the deflector 300 and the upper surface 52*a* of the body flange 52 and preventing fire suppressant leakage past the blocking member 420.

The nozzle assembly 28 is generally sized for application to a protected area using a K-factor which is dependent on the inlet supply pressure to each nozzle 28. The flow rate is determined by the available pressure to each nozzle 28 using an industry standard formula. Flow in GPM=K-factor×(Pressure (PSI))$^{1/2}$. The flow rate of the nozzle 28 is designed to provide at least a 0.1 GPM per square foot. (SQ. FT.) application density of firefighting or fire suppressant foam over an area of coverage, e.g., the protected area 12. Preferably the K-factor of the nozzle 28 has a range of about 23-26 GPM/(PSI))$^{1/2}$ for 360 degree coverage nozzle configurations (e.g., the configuration of the deflector 100). In some embodiments, K-factors covered by the nozzle 28 can range from 6-7 GPM/(PSI))$^{1/2}$ for a 90 degree coverage configuration; from 12-13 GPM/(PSI))$^{1/2}$ for a 180 degree coverage configuration, and from 23-25 GPM/(PSI))$^{1/2}$ for a 360 degree coverage configuration. More preferably, in some embodiments, K-factors covered by the nozzle 28 can range from 6.4 to 7.3 GPM/(PSI))$^{1/2}$ for 90 degree patterns (see FIG. 13), from 11.9 to 13.6 GPM/(PSI))$^{1/2}$ for 180 degree patterns (see FIG. 12), and from 23.3 to 25.7 GPM/(PSI))$^{1/2}$ for 360 degree patterns (e.g., the deflector 100). Preferably, the inlet pressure range to achieve the desired K-factor is from about 40 psi to 100 psi.

Preferred embodiments of the nozzle assembly 28 can generate and discharge a firefighting foam, and more preferably discharge an FF foam from an FF solution to protect a floor having a crown or a slope. Preferred embodiments of the nozzle assembly 28 have been installed as floor nozzle in a grate nozzle assembly surrounded by a floor area of 25 ft.×25 ft. that defines a slope with respect to the deflector of 1 in: 8 ft. An FF foam concentrate of at least 3%, and more preferably a 3% concentrate, is supplied as an FF solution to the nozzle assembly 28 at a minimum pressure of 40 psi. Alternatively, the FF solution can be made from a 6% concentrate. The preferred nozzle assembly 28 and its means generates and distributes an FF foam with an effective foam quality at a radial distance of 25 ft. along the slope from the deflector to totally cover the six hundred and twenty-five square foot area. Moreover, the preferred generating and distributing means distributes or spreads the foam to reach a radial distance of 25 ft. along the slope within one minute or less, preferably in less than thirty seconds (30 sec.), more preferably in less than twenty seconds (20 sec.), even more preferably in less than ten seconds (10 sec.) and yet even more preferably in less than five seconds (5 sec.). In addition to totally covering the test area, the means distributes the fluorine-free foam at an application density over the floor area of at least 0.1 GPM/SQ. FT and more preferably at least at 0.2 GPM/SQ. FT. in a one square foot area located at a radial distance up the slope of 25 ft. from the deflector.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. While steps are presented in a given order, alternative embodiments may perform steps in a different order. Moreover, the various embodiments described herein may also be combined to provide further embodiments. Reference herein to "one embodiment," "an embodiment," or similar formulations means that a particular feature, structure, operation, or characteristic described in connection with the embodiment can be included in at least one embodiment of the present disclosure. Thus, the appearances of such phrases or formulations herein are not necessarily all referring to the same embodiment.

For ease of reference, identical reference numbers are used to identify similar or analogous components or features throughout this disclosure, but the use of the same reference number does not imply that the features should be construed to be identical. Indeed, in many examples described herein, identically numbered features have a plurality of embodiments that are distinct in structure and/or function from each other. Furthermore, the same shading may be used to indicate materials in cross section that can be compositionally similar, but the use of the same shading does not imply that the materials should be construed to be identical unless specifically noted herein.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Additionally, the term "comprising" is used throughout to mean including at least the recited feature(s) such that any greater number of the same feature and/or additional types of other features are not precluded. Directional terms, such as "upper," "lower," "front," "back," "vertical," and "horizontal," may be used herein to express and clarify the relationship between various elements. It should be understood that such terms do not denote absolute orientation. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A floor fire suppressant system comprising:

a floor area with a crowned peak and covering at least 25 ft.×25 ft., the floor area having an inclined surface sloping upward from a floor nozzle for a distance of at least 25 ft., the inclined surface having a slope of 1 in: 8 ft.; and the floor nozzle having:

a body;

a deflector supported on the body; and a plurality of projection members between the body and the deflector circumferentially spaced about a central nozzle axis, each projection member having a planar side wall with a radiused inner edge with an inner radius larger than an outer radius of a radiused outer edge to define a plurality of passageways with parallel passageway side walls configured to generate and distribute a fluorine-free foam to totally cover the floor area of at least 25 ft.×25 ft. at an application density of at least 0.1 GPM/SQ. FT; the distributed foam at a radial distance of 25 ft. along the inclined surface from the deflector having an effective foam quality.

2. The floor fire suppressant system of claim 1, wherein the fluorine-free foam is distributed so as to reach a radial distance of 25 ft. along the slope within less than one minute (1 min.).

3. The floor fire suppressant system of claim 2, wherein the fluorine-free foam is distributed so as to reach the radial distance of 25 ft. along the slope in less than thirty seconds (30 sec.).

4. The floor fire suppressant system of claim 1, wherein the fluorine-free foam is distributed with an application density of at least 0.2 GPM/SQ. FT. in a one square foot area located at a radial distance up the slope of 25 ft. from the deflector.

5. The floor fire suppressant system of claim 1, wherein the fluorine-free foam is generated from a 3% solution of fluorine free concentrate.

6. A floor nozzle for a floor fire suppressant system for protecting a floor area with a crowned peak, the floor nozzle comprising:

a body;

a deflector supported on the body; and means for generating and distributing a fluorine-free foam to totally cover at least 25 ft.×25 ft. of the floor area at an application density of at least 0.1 GPM/SQ. FT., the floor area having an inclined surface sloping upward from the floor nozzle for a distance of at least 25 ft.; the distributed foam at a radial distance of 25 ft. along the inclined surface from the deflector having an effective foam quality, wherein the means includes a plurality of passageways between the body and the deflector and circumferentially spaced about a central nozzle axis, each passageway having a converging inlet portion and a diverging outlet portion, through which the foam exits to form a generally lateral radial pattern for delivering to the floor area, each passageway having first and second side walls positioned between the converging inlet portion and the diverging outlet portion, and wherein the first and second side walls are parallel to one another and include a radiused inner edge in the converging portion with a larger radius than a radiused outer edge in the diverging portion, and wherein the each of the first and second side walls includes a planar portion that defines a constant width between the first and second side walls over a height and a length of the first and second side walls.

7. The floor nozzle of claim 6, wherein a ratio of a cross-sectional area of each passageway at an entrance of the diverging outlet portion to a height of the deflector is about 1:40 to 1:60.

8. The floor nozzle of claim 6, wherein each passageway has a first height at the diverging outlet portion and a second height at the converging inlet portion, a ratio of the first height to the second height is from 1:1.2 to 1:1.3.

9. The floor nozzle of claim 6, wherein each passageway has a width between the first and second side walls, and wherein the width is no less than ⅛ inch.

10. The floor nozzle of claim 9, wherein each passageway has a height between the divergent outlet portion and the convergent inlet portion of each passageway, and wherein the height is no less than ⅛ inch.

11. The floor nozzle of claim 6, wherein a ratio of the length of the converging inlet to the length of the diverging outlet along the passageway is about 1:1.1 to 1:1.3.

12. The floor nozzle of claim 6, wherein the body includes a mounting portion configured to couple to a fire suppressant supply pipe and an internal transverse passage along a central nozzle axis defining an inlet opening and an outlet opening, the body including a body flange portion spaced from the mounting portion opening and extending around the outlet opening, the body flange portion including an upper support surface; and the deflector supported on the upper support surface of the body flange portion, the deflector having a deflector flange including an upper surface disposed normal to the central nozzle axis, a lower surface angled with respect to the upper surface and an outer perimeter between the upper surface and the lower surface circumscribing the central nozzle axis to define a linear frustoconical portion of the deflector that extends radially inward at a radial length from the outer perimeter, the deflector flange including a plurality of projecting members each having a radial inner portion and a radial outer portion, the plurality of projecting members extending from the lower surface of the deflector flange in supporting contact with the support surface of the body flange portion, the support surface of the body flange portion being angled with respect to the upper surface of the deflector flange, the plurality of projecting members being circumferentially spaced around the outlet opening to form the plurality of passageways therebetween, wherein:

i) the plurality of projecting members extending from the outer perimeter radially inward along a majority of the radial length of the linear frustoconical portion; and/or ii) the lower surface of the deflector flange defines a first angle with respect to the upper surface of the deflector flange, the support surface of the body flange portion defines a second angle with respect to the upper surface of the deflector flange, the first angle being less than the second angle.

13. The floor nozzle of claim 12, wherein a first thickness of the deflector at the outer perimeter is defined between the upper surface and the lower surface of the deflector flange and a second deflector thickness of the deflector defined by a height of the plurality of projecting members between the lower surface of the deflector flange and the support surface of the body flange portion, a ratio of the first thickness-to-the second thickness is about 1:1.5 to 1:1.7.

14. The floor nozzle of claim 12, wherein each projecting member has a height at an entrance of the diverging outlet portion of each passageway with adjacent projecting members defining a width of each passageway between the first and second side walls, a ratio of the projecting member height to the passageway width being about 1:1 to 1:1.4.

15. The floor nozzle of claim 12, wherein the plurality of projecting members consists of one of 24 projecting members or 32 projecting members.

16. The floor nozzle of claim 12, wherein the deflector defines a coverage configuration ranging from 90 degrees-360 degrees, the body and the deflector defining a K-factor of 6 to 26 GPM/(PSI))$^{1/2}$ such that for a minimum pressure of 40 psi of fluorine-free solution supplied to the inlet opening, the solution flowing through the outlet opening and through the passageways at a flow rate to deliver the fluorine-free foam at least at a 0.1 GPM/SQ. FT application density over the protected area.

17. The floor nozzle of claim 16, further comprising:

a mounting assembly for mounting the floor nozzle, the mounting assembly including a recess cavity for receiving and supporting the floor nozzle.

18. The floor nozzle of claim 17, wherein the mounting assembly includes a floor grate having the recessed cavity with a transverse opening for receiving and supporting the nozzle assembly such that the upper surface of the deflector flange is flush with the floor grate.

19. A method of delivering a fluorine-free foam over a protected area having a floor area with a crowned peak, the method comprising:

positioning a floor nozzle wherein the floor nozzle includes a body, a deflector engaged with the body, and plurality of projection members between the body and the deflector for generating and distributing a fluorine-free foam to totally cover at least 25 ft. x 25 ft. of the floor area at an application density of at least 0.1 GPM/SQ. FT., the floor area having an inclined surface sloping upward from the floor nozzle for a distance of at least 25 ft.; the distributed foam at a radial distance of 25 ft. along the inclined surface from the deflector having an effective foam quality, and wherein each projection member includes a radiused inner edge, a radiused outer edge, and a planar wall extending between the radiused inner edge and the radiused outer edge, and wherein adjacent projection members define a passageway with two side walls that are parallel between the body and deflector with a constant width over a height and a length of each passageway; and flowing a fluorine-free solution through the floor nozzle for generating and distributing the fluorine-free foam over the protected area.

20. The method of claim 19, wherein an inner radius of the radiused inner edge being larger than an outer radius of the radiused outer edge.

21. A floor nozzle assembly, comprising:

a floor nozzle including:

a body;

a deflector supported on the body, the deflector including an upper surface; and a plurality of projection members between the body and the deflector circumferentially spaced about a central nozzle axis, each projection member having a planar side wall with a radiused inner edge with an inner radius larger than an outer radius of a radiused outer edge to define a plurality of passageways with parallel passageway side walls; and a mounting assembly including a floor grate having a recessed cavity with a transverse opening for receiving and supporting the floor nozzle such that the upper surface of the deflector is flush with the floor grate.

22. The floor nozzle assembly of claim 21, further comprising:

a pipe supply connected to the body for delivering water or a foam-water solution to the floor nozzle.

23. The floor nozzle assembly of claim 21, the deflector further comprising:

a lower surface defining a first angle with respect to the upper surface, wherein the upper surface is disposed normal to the central nozzle axis; and an outer perimeter between the upper surface and the lower surface circumscribing the central nozzle axis to define a portion of a frustoconical shape, wherein the plurality of projecting members extends from the outer perimeter radially inward along a majority of a radial length of the portion of the frustoconical shape.

24. The floor nozzle assembly of claim 23, wherein the plurality of projecting members extends from the outer perimeter radially inward along 70% or more of the radial length.

25. The floor nozzle assembly of claim 23, wherein a support surface of the body defines a second angle with respect to the upper surface of the deflector, and wherein the first angle is greater than the second angle.

26. The floor nozzle assembly of claim 23, the deflector further comprising:

a first thickness defined by a height of a radially outward edge of the plurality of projecting members disposed between the upper surface and the lower surface at the outer perimeter; and a second thickness defined by a height of a radially inward edge of the plurality of projecting members disposed between the lower surface and an upper support surface of the body, wherein the second thickness is greater than the first thickness.

27. The floor nozzle assembly of claim 21, wherein each of the projecting members includes a first planar side wall with a first radiused outer edge and a second planar side wall with a second radiused outer edge, and wherein each of the projecting members further includes a curved edge disposed between the first radiused outer edge and the second radiused outer edge, the curved edge having a different curvature than the first radiused outer edge and the second radiused outer edge and a same radius as an outer perimeter of the deflector.

28. The floor nozzle assembly of claim 21, further comprising:

a blocking member extending from the deflector toward the body and including a first side wall at a first end and a second side wall at a second end, wherein the first side wall is a planar side wall that forms a passageway with the parallel passageway side wall of a first adjacent projection member, wherein the second side wall is a planar side wall that forms a passageway with the parallel passageway side wall of a second adjacent projection member, wherein the blocking member extends along an arc length, the arc length extending 180 degrees or greater.

29. The floor nozzle assembly of claim 28, wherein the arc length extending 270 degrees or greater.

30. The floor nozzle assembly of claim 28, further comprising:

a sealing gasket disposed within a groove of the blocking member and configured to form a seal between the deflector and the upper surface.

31. A floor nozzle, comprising:

a body;

a deflector supported on the body; and a plurality of projection members between the body and the deflector circumferentially spaced about a central nozzle axis, each projection member having a planar side wall with a radiused inner edge with an inner radius larger than an outer radius of a radiused outer edge to define a plurality of passageways with parallel passageway side walls.

32. The floor nozzle of claim 31, the deflector further comprising:

an upper surface is disposed normal to the central nozzle axis;

a lower surface defining a first angle with respect to the upper surface; and an outer perimeter between the upper surface and the lower surface circumscribing the central nozzle axis to define a frustoconical portion of the deflector.

33. The floor nozzle of claim 31, the deflector further comprising:

a blocking member extending from the deflector toward the body and including a first side wall at a first end and a second side wall at a second end, wherein the first side wall is a planar side wall that forms a passageway with the parallel passageway side wall of a first adjacent projection member, wherein the second side wall is a planar side wall that forms a passageway with the parallel passageway side wall of a second adjacent projection member, wherein the blocking member extends along an arc length, the arc length extending 180 degrees or greater.

34. A deflector for a floor nozzle, the floor nozzle including a body, the deflector:

a plurality of projection members circumferentially spaced about a central nozzle axis, each projection member having a planar side wall with a radiused inner edge with an inner radius larger than an outer radius of a radiused outer edge to define a plurality of passageways with parallel passageway side walls, and a base for being supported on the body.

35. The deflector of claim 34, further comprising:

a blocking member extending from the deflector toward the body and including a first side wall at a first end and a second side wall at a second end, wherein the first side wall is a planar side wall that forms a passageway with the parallel passageway side wall of a first adjacent projection member, wherein the second side wall is a planar side wall that forms a passageway with the parallel passageway side wall of a second adjacent projection member, wherein the blocking member extends along an arc length, the arc length extending 180 degrees or greater.

36. The deflector of claim 35, wherein the arc length extending 270 degrees or greater.

* * * * *